(12) United States Patent
Sawarynski, Jr. et al.

(10) Patent No.: US 11,529,835 B2
(45) Date of Patent: Dec. 20, 2022

(54) ELECTRONICALLY CONTROLLED EXTERNAL DAMPER RESERVOIR

(71) Applicant: Off-Road Research LLC, Farmington Hills, MI (US)

(72) Inventors: Thomas J. Sawarynski, Jr., West Bloomfield, MI (US); Daniel S. Collins, Grass Lake, MI (US)

(73) Assignee: Off-Road Research LLC, Farmington Hills, MI (US)

( * ) Notice: Subject to any disclaimer, the term of this patent is extended or adjusted under 35 U.S.C. 154(b) by 145 days.

(21) Appl. No.: 17/066,469

(22) Filed: Oct. 8, 2020

(65) Prior Publication Data

US 2021/0101434 A1    Apr. 8, 2021

Related U.S. Application Data

(60) Provisional application No. 62/912,376, filed on Oct. 8, 2019.

(51) Int. Cl.
*B60G 17/018* (2006.01)
*B60G 17/015* (2006.01)
(Continued)

(52) U.S. Cl.
CPC ......... *B60G 17/0155* (2013.01); *B60G 13/08* (2013.01); *B60G 13/10* (2013.01); *B60G 17/019* (2013.01); *B60G 17/0152* (2013.01); *B60G 17/0165* (2013.01); *B60G 17/08* (2013.01); *F16F 9/065* (2013.01); *F16F 9/3271* (2013.01); *F16F 9/3292* (2013.01); *F16F 9/50* (2013.01); *B60G 2202/24* (2013.01); *B60G 2202/242* (2013.01); *B60G 2204/62* (2013.01); *B60G 2206/41* (2013.01);

*B60G 2206/80* (2013.01); *B60G 2400/0511* (2013.01); *B60G 2400/0512* (2013.01); *B60G 2400/0513* (2013.01); *B60G 2400/102* (2013.01); *B60G 2400/104* (2013.01); *B60G 2400/106* (2013.01);
(Continued)

(58) Field of Classification Search
CPC ............... B60G 13/08; B60G 17/0152; B60G 17/0164; B60G 17/0165; B60G 17/048; B60G 17/08; F16F 9/34; F16F 9/446
USPC .................. 188/314, 318, 322.21; 280/5.519
See application file for complete search history.

(56) References Cited

U.S. PATENT DOCUMENTS 6,296,091 B1    10/2001  Hamilton
9,108,098 B2    8/2015   Galasso et al.
(Continued)

*Primary Examiner* — Christopher P Schwartz
(74) *Attorney, Agent, or Firm* — Quinn IP Law

(57) ABSTRACT

An electronically controller external damper reservoir assembly (eRESI) can be connected to a passive damper and/or substituted for an existing external reservoir to provide semi-active damping control. The eRESI includes a reservoir and a variable base valve assembly actuated by an actuator. A controller is in communication with the actuator and a sensor providing input signal indicative of vehicle movement and is programmed to generate a damping control signal to the actuator based on the input signal, to dynamically control the damping force outputted by a passive damper hydraulically connected to the eRESI. A P/T sensor can be installed to a gas chamber of a vehicle damper to generate a P/T signal indicative of the pressure and temperature of the gas. The controller is programmed to determine a damper position of the damper based on the P/T signal.

23 Claims, 16 Drawing Sheets

(51) Int. Cl.
*B60G 13/10* (2006.01)
*B60G 17/019* (2006.01)
*B60G 13/08* (2006.01)
*B60G 17/0165* (2006.01)
*B60G 17/08* (2006.01)
*F16F 9/06* (2006.01)
*F16F 9/32* (2006.01)
*F16F 9/50* (2006.01)

(52) U.S. Cl.
CPC .... *B60G 2400/20* (2013.01); *B60G 2400/204* (2013.01); *B60G 2400/252* (2013.01); *B60G 2400/32* (2013.01); *B60G 2400/412* (2013.01); *B60G 2400/5182* (2013.01); *B60G 2400/7162* (2013.01); *B60G 2500/114* (2013.01); *B60G 2600/184* (2013.01); *B60G 2800/162* (2013.01); *F16F 2222/12* (2013.01); *F16F 2226/04* (2013.01); *F16F 2228/066* (2013.01); *F16F 2230/08* (2013.01); *F16F 2230/18* (2013.01); *F16F 2232/08* (2013.01); *F16F 2234/02* (2013.01)

(56) References Cited

U.S. PATENT DOCUMENTS

| | | | |
|---|---|---|---|
| 9,422,018 | B2 | 8/2016 | Pelot et al. |
| 10,029,172 | B2 | 7/2018 | Galasso et al. |
| 10,036,443 | B2 | 7/2018 | Galasso et al. |
| 10,472,013 | B2 | 11/2019 | Pelot et al. |
| 10,537,790 | B2 | 1/2020 | Galasso et al. |
| 10,556,477 | B2* | 2/2020 | Marking ............ F16F 9/446 |
| 10,670,106 | B2 | 6/2020 | Ericksen et al. |
| 10,718,397 | B2 | 7/2020 | Marking |
| 10,759,247 | B2 | 9/2020 | Galasso et al. |
| 10,814,690 | B1* | 10/2020 | Katzourakis ....... B60G 17/0165 |
| 2013/0249175 | A1* | 9/2013 | Ellifson ............ F16F 9/096 188/314 |
| 2013/0328277 | A1* | 12/2013 | Ryan ............ B60G 17/0165 280/5.519 |
| 2016/0153516 | A1 | 6/2016 | Marking |
| 2016/0265615 | A1 | 9/2016 | Marking |
| 2019/0176557 | A1 | 6/2019 | Marking et al. |
| 2019/0203798 | A1 | 7/2019 | Cox et al. |
| 2020/0249129 | A1 | 8/2020 | Fazeli et al. |
| 2021/0122205 | A1 | 4/2021 | Shukla et al. |

* cited by examiner

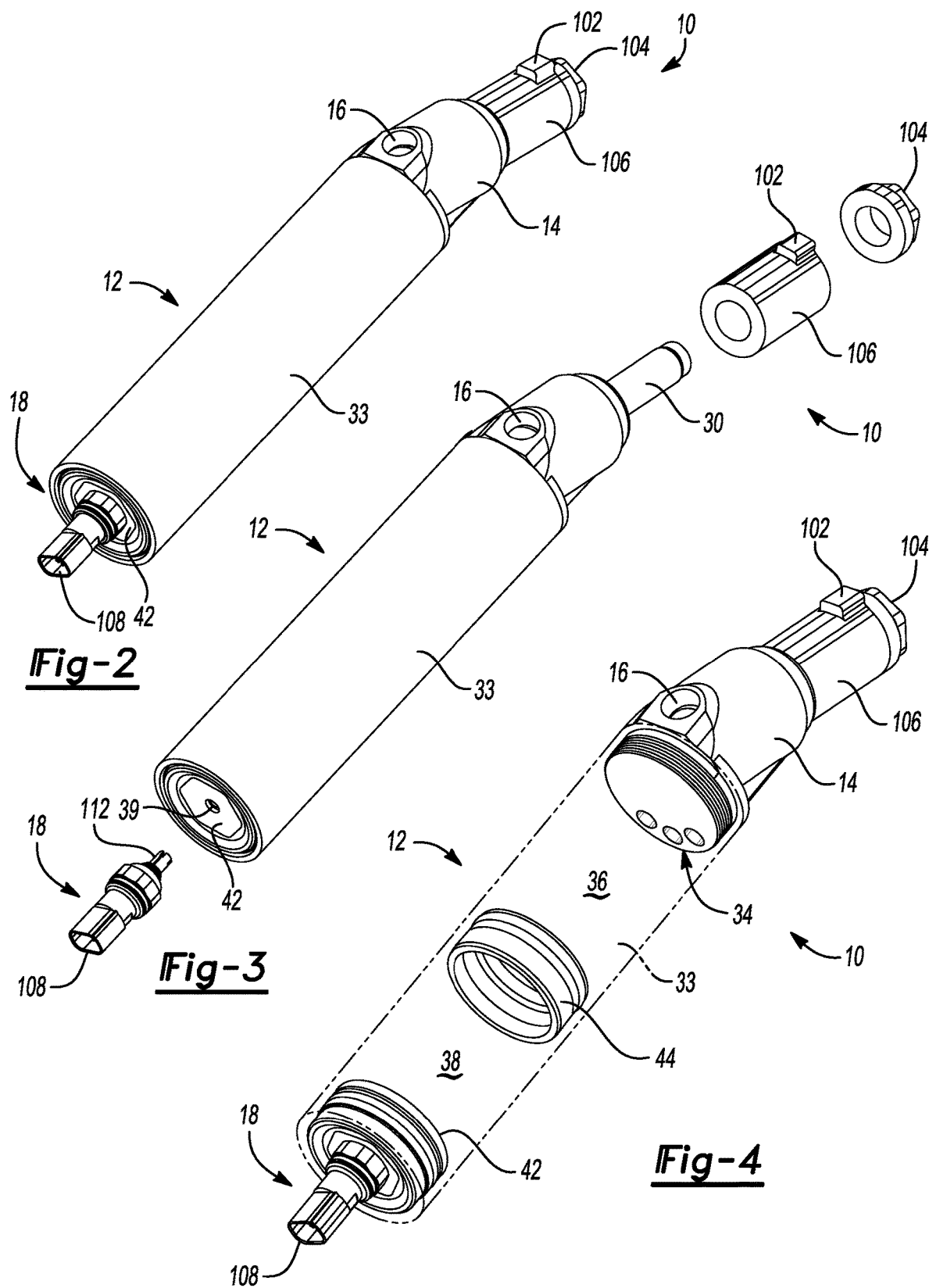

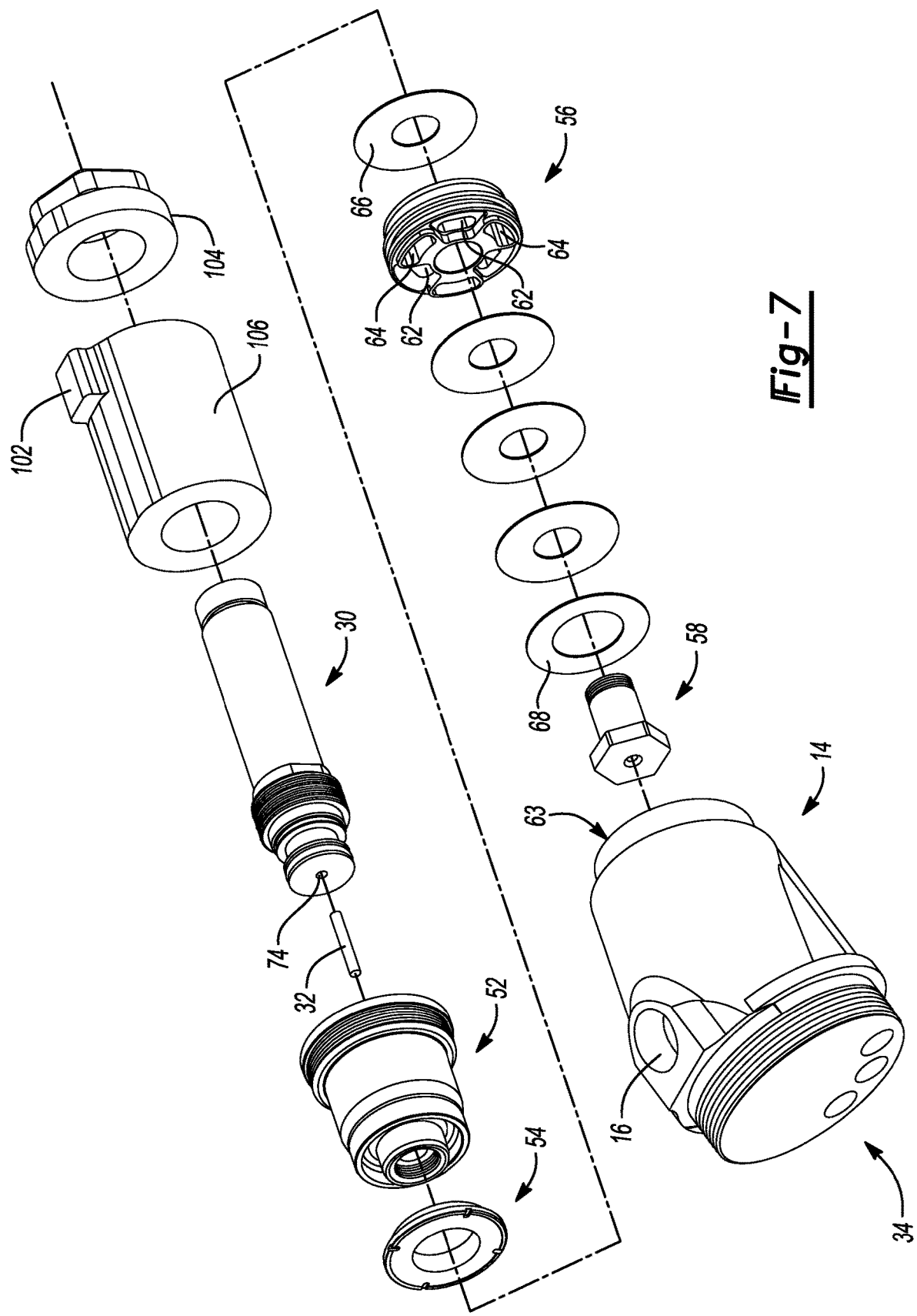

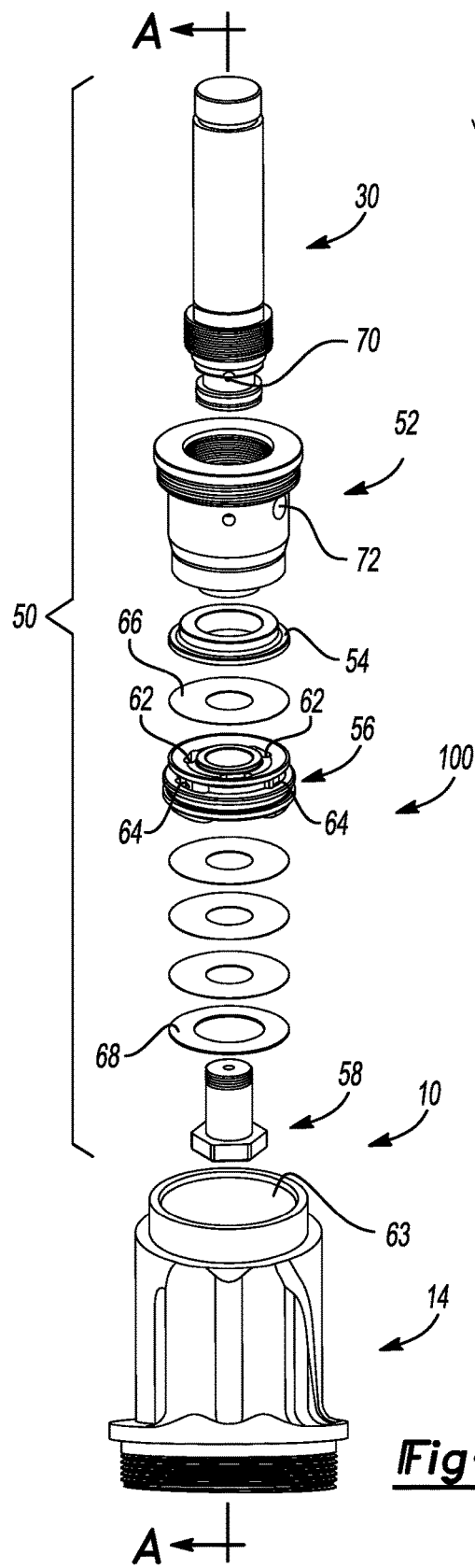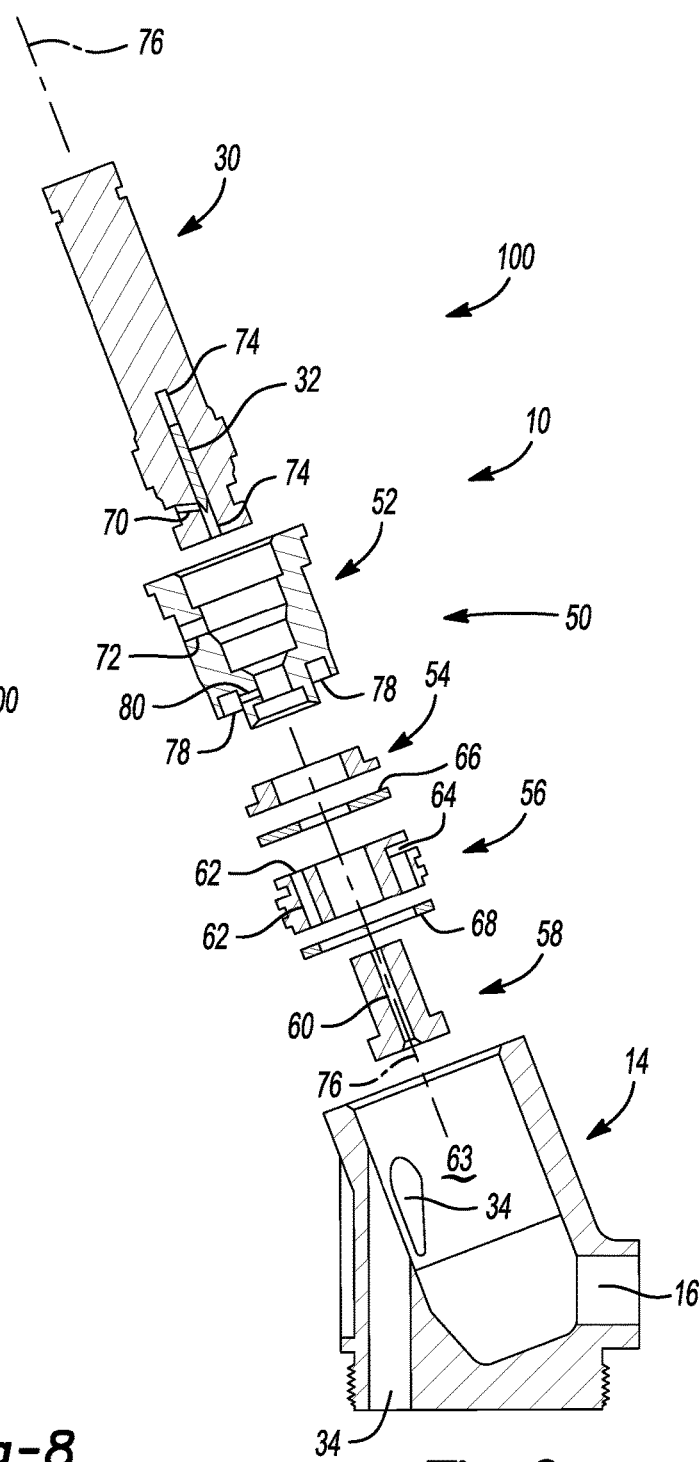

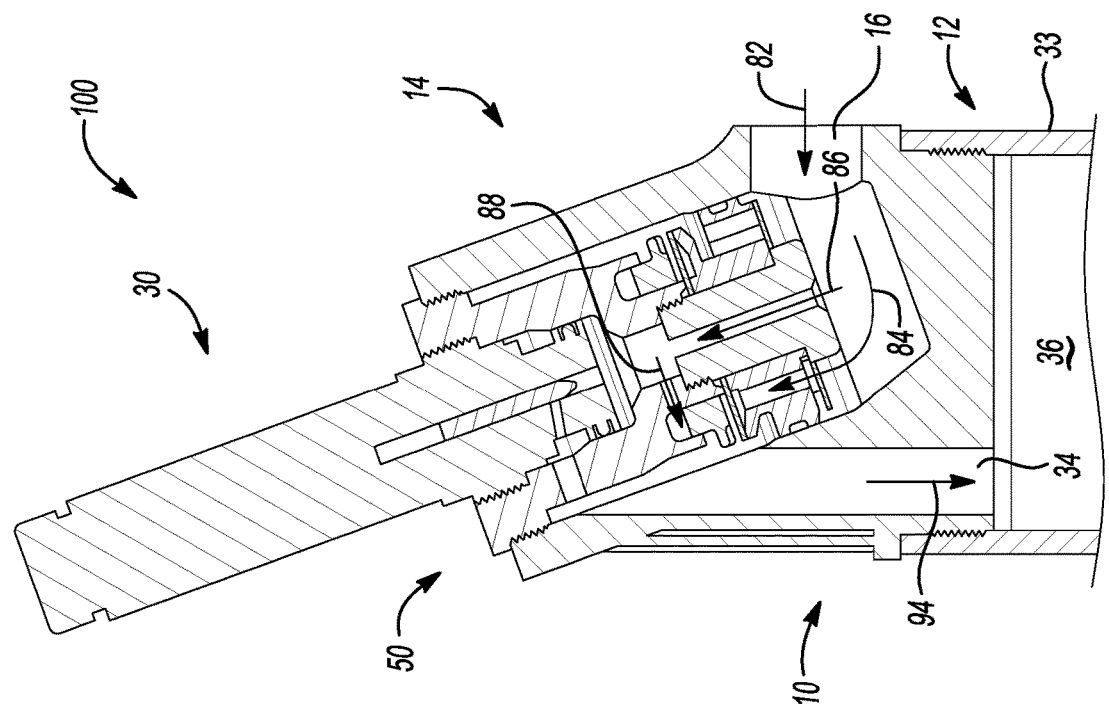
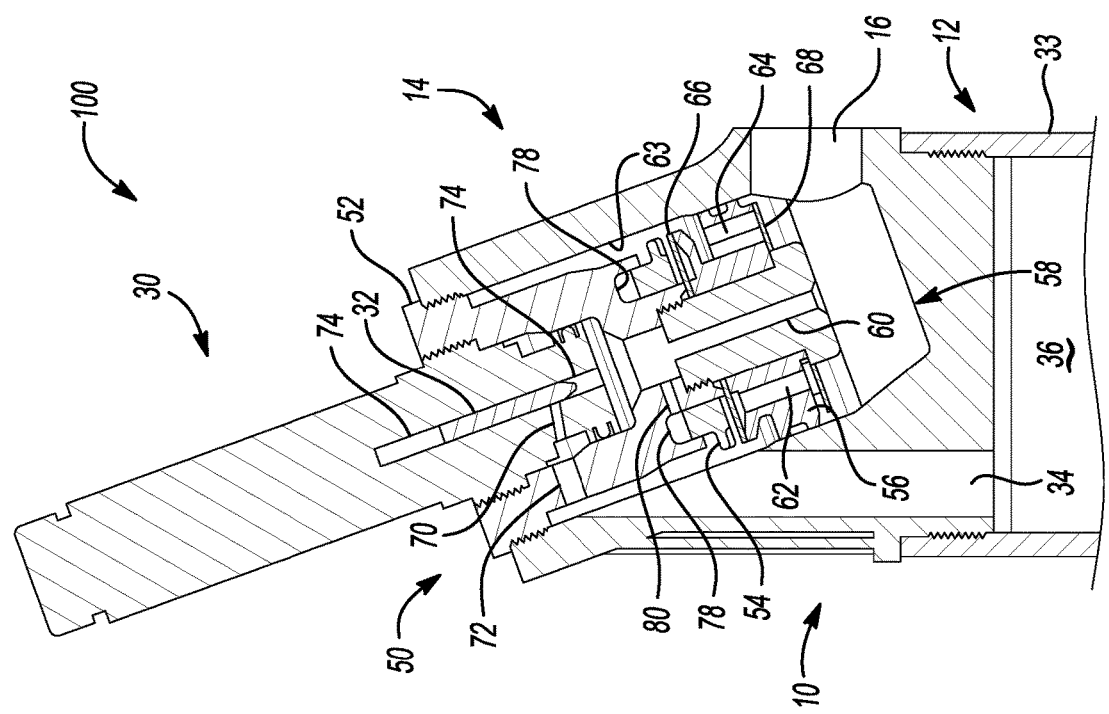

ELECTRONICALLY CONTROLLED EXTERNAL DAMPER RESERVOIR

CROSS-REFERENCE TO RELATED APPLICATION

This application claims the benefit of U.S. Provisional Application No. 62/912,376, filed Oct. 8, 2019, which is hereby incorporated by reference in its entirety.

TECHNICAL FIELD

The present disclosure relates to an external reservoir for use with a damper, and to a system and method for determining a position of the damper.

BACKGROUND

A vehicle is originally equipped (OE) by the vehicle manufacturer with a suspension system including dampening systems which provide a damping response to vehicle inputs. A vehicle owner may wish to modify the OE dampening system to change the feel and/or handling dynamics of the vehicle, for example, based on the vehicle owner's preference, by replacing the all or portions of the OE dampening system with non-OE (aftermarket) damping components.

A vehicle owner may wish to install a passive dampening system which includes a monotube damper which is fluidly connected to an external reservoir, where the external reservoir functions to improve heat dissipation during operation of the suspension system and to avoid cavitation in the hydraulic fluid in the dampening system. The external reservoir can be hydraulically connected to the monotube damper in a piggyback arrangement such that the reservoir is attached directly the damper. The external reservoir can be connected via a hydraulic connector, including, for example, a hydraulic hose fitted to each of the damper and the external reservoir by hydraulic fittings, where hydraulic fluid flows between the damper and external reservoir through the hydraulic hose. This arrangement can be advantaged by additional cooling of the hydraulic fluid as the fluid travels through the length of the hose between the damper and the reservoir. The passive damper and/or the external reservoir can include a gas chamber separated from an oil chamber by a floating divider or piston, where a gas, often nitrogen, contained in the gas chamber is squeezed during compression of the damper to compensate for the hydraulic oil in the oil chamber being displaced by the damper shaft being compressed into the hydraulic oil. The pressure exerted on the floating piston and continuously on the hydraulic oil, acts to prevent cavitation of the hydraulic oil during movement of the damper shaft in compression and rebound.

The vehicle owner may wish to convert from the passive dampening system to a semi-active system. This would typically require replacement of the entire passive dampening system, including installation of replacement semi-active dampers, a control unit, additional controllers, and/or additional sensors to the vehicle, such that aftermarket semi-active systems are very costly. Some aftermarket semi-active systems include a semi-active damper assembly with includes a damper and a reservoir which is either integrated with the damper assembly, for example, in a piggyback configuration, or remotely located from the damper and connected via a hydraulic hose. The reservoir of the semi-active aftermarket system can include, for example and as described in US Patent Application 2016/0153516, a base valve assembly and an auxiliary bypass valve assembly, where the auxiliary bypass valve assembly is controlled by actuation of a solenoid or stepper motor, such that flow of the hydraulic fluid through the base valve assembly and flow of hydraulic fluid through the auxiliary bypass valve assembly are in parallel with each other. As such, changes in control force, i.e., damping force, are accomplished by actuation of the auxiliary valve in parallel with the passive response of the base valve assembly, which may limit response time and/or may limit the range of the damping response, e.g., may limit the magnification of damping provided by the semi-active system relative to the damping force of a standard passive damper.

SUMMARY

An electronically controlled external damper reservoir module, abbreviated as eRESI, is disclosed herein. As further described herein, the eRESI module can be connected to a standard passive damper and/or substituted for an existing external reservoir, to provide a semi-active variant to the dampening system of a vehicle, such that a vehicle owner can change the feel and/or handling dynamics of the vehicle without incurring the costly expense of replacing an OE dampening system with a complete aftermarket semi-active dampening system. Further, the eRESI module described herein can be installed to any standard passive damper such that the eRESI module can be installed into multiple makes and models of vehicles, and as such, provides a lower cost, modular solution for aftermarket modification of a vehicle dampening system from a passive to semi-active system.

As further described in detail herein, the eRESI module disclosed herein includes a base valve technology which utilizes an electronically controlled variable base valve assembly inside the eRESI reservoir, and which is in series with the main piston valve of a damper hydraulically connected to the remote eRESI module, such that changes in the damping force generated by the eRESI module include the serial effects of the base valve and the electronically controlled valve of the eRESI variable base valve assembly, and such that the response time is decreased (improved) and the range of possible magnification of damping force as compared to a baseline damping force of the passive damper is increased, relative to the response time and range of possible damping which can be realized from a passive damper connected to a traditional, e.g., passive, reservoir assembly.

The eRESI module disclosed herein is advantaged by being configured as a standalone module which can be hydraulically connected to any standard monotube damper to provide semi-active control of the standard damper connected to the eRESI module. Because the eRESI module is universal, e.g., adaptable to any damper, the eRESI module provides a lower cost to modifying a vehicle dampening system to provide semi-active damping capabilities, as compared with aftermarket systems which include a damper and reservoir and are configured for installation to one vehicle type, make or model and/or to a limited number of vehicle makes and models.

The eRESI module disclosed herein is advantaged by using a variable base valve assembly to control system restriction and thus generate force across the operating range. This arrangement, which is controlled by an actuator piloting a restrictor piston valve which is coaxial with the base piston valve in the variable base valve assembly, provides a rapid and cumulative response to vehicle and road inputs received by the eRESI controller actuating the actuator. In comparison, dedicated semi-active systems including dedicated damper and reservoir combinations can use a solenoid valve to bypass the base valve assembly, such that the bypass control function is parallel to, and not cumulative with, a managed base valve response.

The eRESI module is compact in design, including an eRESI controller which can be integrated into the eRESI reservoir assembly, can be mounted on to the eRESI assembly, and/or can be located remotely, to provide options in configuration and mounting. In one example, the functions of the eRESI controller are performed by a vehicle control module programmed to perform the eRESI controller functions, and such that a dedicated eRESI controller is not required. Further, configurations are described herein whereby the eRESI module can operate without input from the vehicle system or vehicle network, and/or without input from original equipment sensors or modules, such that the eRESI module disclosed herein is adaptable to a vehicle damping system independent of the original equipment configuration of the vehicle. Likewise, because the eRESI module is adaptable to, e.g., can be used to control, any standard monotube damper, the eRESI module is highly flexible and universal in design. Monotube dampers, patented by Bilstein in 1953, are widely used in vehicles. Because the eRESI module is completely independent of the technology located inside a monotube damper, e.g., can be installed universally to any monotube damper, the eRESI module can be readily and easily installed to any vehicle suspension including monotube dampers, to add semi-active control to the monotube damper and to the vehicle dampening system, and at a substantially reduced cost relative to combination damper/reservoir semi-active systems.

The eRESI module can include a sensing device, referred to herein as a P/T sensor, installed in fluid communication with gas contained in a gas chamber of the eRESI assembly, including a temperature sensor and pressure transducer configured to measure the temperature (T) and pressure (P) of the gas in the eRESI gas chamber, and to output a P/T signal to the eRESI controller or other control module in real time, such that the temperature and pressure of the gas can be used by a damper position algorithm stored to the eRESI controller to determine a position of a damper rod of a damper to which the eRESI module has been installed and calibrated. The P/T sensor can be connected to the eRESI controller, for example, via a wiring harness, or can transmit the P/T signal wirelessly, for example, using RF technology, etc., to the eRESI controller or to a vehicle network. The system is advantaged by using the measured pressure and temperature of the eRESI gas to determine damper position, such that use of the eRESI P/T sensor and damper position algorithm obviates the need for and associated cost and complexity of installing separate, independent damper position sensors to the vehicle as a means to measure damper position. Accordingly, the system and method described herein to determine damper position replaces brackets, fasteners, positions sensors, links, etc. conventionally installed to a vehicle to sense damper position, with a low cost, simplified technology for damper position measurement of a passive damper which can be installed to an existing suspension system with minimal or no modification.

In another configuration, the P/T sensing device described herein can be installed directly to a passive damper or passive damper reservoir installed to the vehicle, in fluid communication with a gas chamber of the damper or the gas chamber of the passive reservoir attached to the damper, and calibrated to transmit a P/T signal of the pressure and temperature of the gas in the damper gas chamber to the vehicle network for application of a damper position algorithm to the P/T signal to determine the damper position in real time, such that the damper position technology described herein is readily adaptable to existing vehicle hardware and/or to any passive damper or damper-reservoir installed to the vehicle. The use of the measured gas pressure to determine damper position is unexpected and the system and method described herein provides significant advantages, including reduction in vehicle hardware, weight, cost and complexity as compared with conventional damper position measurement systems, demonstrated correlation to conventional damper position measurements, and flexibility, as the damper position measurement system described herein is adaptable, e.g., installable to any passive damping system with little or no hardware modification of the passive damping system and/or vehicle.

A system for converting a damping system including a passive damper to a semi-active damping system is described herein, the system including an electronically controlled external damper reservoir (eRESI) assembly including a reservoir port configured to hydraulically connect the eRESI assembly to a passive damper and to receive hydraulic fluid from the passive damper via the reservoir port, a variable base valve assembly including an actuator, wherein the actuator is configured to selectively change a flow rate of hydraulic fluid through the variable base valve assembly in response to a damping control signal received by the actuator, a hydraulic chamber in fluid communication with a reservoir port via the variable base valve assembly, and a gas chamber containing a gas, such a nitrogen gas. The system further includes an input sensor configured to generate an input signal indicative of a vehicle movement and/or a condition related to the vehicle movement, a controller in electronic communication with the input sensor and the actuator, wherein the controller includes a tangible, non-transitory memory to which instructions and/or algorithms are stored, such that the controller is programmed to receive the input signal from the input sensor, to generate the damping control signal based on the input signal, and to output the damping control signal to the actuator.

In one example, the input signal includes at least one input signal indicative of a vehicle movement or a condition related to the vehicle movement selected from a group consisting of: damper position of a passive damper hydraulically connected to the eRESI assembly, movement of a damper rod of the passive damper, damper rod velocity, damper rod acceleration, vehicle body motion, vehicle body roll, vehicle body pitch, vehicle body yaw, roll velocity, G-force, pitch velocity, vehicle speed, vehicle acceleration, vehicle inertial data, wheel motion, wheel speed, wheel position, suspension motion, brake torque, throttle position, steering wheel angle, steering wheel angle rate, vehicle acceleration along Ax, Ay, and/or Az vehicle axes, suspension position, temperature, engine torque, tire pressure, vision sensor data, forward looking terrain mapping, global positioning data, Lidar data, and combinations thereof. In one example, the input sensor is configured as a pressure and temperature (P/T) sensor in direct fluid communication with the gas contained in the gas chamber;, where the P/T sensor is configured to measure a pressure and a temperature of the gas and to generate a P/T signal indicative of the pressure and the temperature of the gas. The P/T sensor is configured to transmit the P/T signal to the controller, and the controller is programmed to determine a damper position of a passive damper hydraulically connected to the eRESI assembly, based on the P/T signal transmitted from the P/T sensor.

In one example, the passive damper includes a damper rod and a damper cylinder, such that the damper position is defined by the position of the damper rod relative to the damper cylinder. The controller can be programmed to determine, based on the P/T signal received from the P/T sensor, a direction of travel of the damper rod relative to the damper cylinder and a velocity of the damper rod. The controller can be further programmed to generate the damping control signal based on a combination of the position, the direction of travel, and the velocity of the damper rod as determined in real time by the controller based on the P/T signal.

In one example, the input sensor includes an inertial measurement unit (IMU) configured to sense inertia of a vehicle including the passive damper and to transmit the input signal based on the inertia of the vehicle to the controller, where the controller is programmed to generate the damping control signal based on a combination of the P/T signal and the input signal based on the inertia of the vehicle. The input sensor can be configured as at least one of a vehicle module or a vehicle sensor such that the input signal, in this example, is generated by the at least one of the vehicle module or vehicle sensor, and the controller can be programmed to generate the damping control signal based on a combination of the P/T signal and the input signal generated by the at least one of the vehicle module or vehicle sensor.

As described herein and illustrated by the figures, the gas chamber can include an end cap configured to seal the gas chamber, where in one example, the P/T sensor is integral to the end cap. In one example, the controller is a vehicle control module and the controller is in electronic communication with the actuator via a vehicle network. In another example, the controller is in wireless communication with the actuator.

The actuator can be configured to selectively actuate the variable base valve assembly between a first valve position and a second valve position, where the variable base valve assembly is configured such that, with the variable base valve assembly actuated to the first valve position, a compression force outputted by a passive damper hydraulically connected to the eRESI assembly is substantially the same as a baseline compression force outputted by the passive damper when connected to a passive reservoir. The variable base valve assembly can be configured such that, with the variable base valve assembly actuated to the second valve position, the compression force outputted by the passive damper hydraulically connected to the eRESI assembly is increased to a range which is 1.5 to 10 times the baseline compression force.

In one example, the variable base valve assembly is configured such that the variable base valve assembly is in series with a main piston valve of a passive damper hydraulically connected to the eRESI assembly.

Described herein is a method for converting a damping system including a passive damper to a semi-active damping system, the method including hydraulically connecting an electronically controlled external damper reservoir (eRESI) assembly to a passive damper via a reservoir port, the eRESI assembly including the reservoir port configured to hydraulically connect the eRESI assembly to a passive damper and to receive hydraulic fluid from the passive damper via the reservoir port, a variable base valve assembly including an actuator, wherein the actuator is configured to selectively change a flow rate of hydraulic fluid through the variable base valve assembly in response to a damping control signal received by the actuator, a hydraulic chamber in fluid communication with a reservoir port via the variable base valve assembly, and a gas chamber containing a gas. The method further includes sensing a vehicle movement or a condition related to the vehicle movement, via an input sensor configured to generate an input signal indicative of at least one of the vehicle movement or the condition related to the vehicle movement, providing a controller in electronic communication with the input sensor and the actuator, wherein the controller includes a processor and tangible, non-transitory memory on which is recorded instructions, such that the controller is programmed to receive the input signal from the input sensor, to generate the damping control signal based on the input signal, and to output the damping control signal to the actuator, and receiving, via the hydraulic port, hydraulic fluid from the passive damper. The method further includes sensing, via the input sensor, the vehicle movement and/or the condition related to the vehicle movement, generating, via the input sensor, the input signal, receiving the input signal to the controller, generating, via the controller, the damping control signal based on the input signal, and outputting the damping control signal to the actuator.

The method can further include receiving, via the actuator, the damping control signal from the controller and actuating the variable base valve assembly, via the actuator, to selectively change a flow rate of hydraulic fluid through the variable base valve assembly based on the damping control signal received by the actuator. In one example, the method can include calibrating the eRESI assembly to the passive damper by inputting a calibration data set to the controller, wherein the calibration data set includes a pressure, a temperature, and a volume of the gas contained in the gas chamber while the passive damper is in a known damper position. In one example, the known position is a full rebound position. In one example, the calibration data set is determined from a specification defined for the passive damper. In one example, the calibration data set is determined by direct measurement of the data with the passive damper in one or more know damper positions.

In one example, the input sensor can be configured as a pressure and temperature (P/T) sensor in direct fluid communication with the gas contained in the gas chamber and the method can further include measuring, via the P/T sensor, a pressure and a temperature of the gas, generating, via the P/T sensor, the input signal configured as a P/T signal indicative of the pressure and the temperature of the gas, receiving, via the controller, the P/T signal, and determining, via the controller, a damper position of the passive damper, based on the P/T signal received from the P/T sensor. The method can include determining, via the controller, a damper position of the vehicle damper, based on the P/T signal received from the P/T sensor.

In one example, the passive damper includes a damper rod and a damper cylinder, where the damper position is defined by the position of the damper rod relative to the damper cylinder, and where the controller is programmed to determine, based on the P/T signal received from the P/T sensor, a direction of travel of the damper rod relative to the damper cylinder and a velocity of the damper rod, such that the method can further include determining, via the controller and based on the P/T signal, the damper position, the direction of travel, and the velocity of the damper rod, and generating, via the controller, the damping control signal based on a combination of the position, the direction of travel, and the velocity of the damper rod as determined in real time by the controller based on the P/T signal.

In one example, the method includes receiving, via the controller, inertia data from an inertial measurement unit (IMU) in electronic communication with the controller, and generating, via the controller, the damping control signal based on a combination of the inertia data and the P/T signal.

A system for determining a damper position of a vehicle damper is described herein. The system includes a pressure and temperature (P/T) sensor configured for installation in direct fluid communication with a gas contained in a gas chamber of a vehicle damper, where the P/T sensor is configured to measure a pressure and a temperature of the gas and to generate a P/T signal indicative of the measured pressure and the measured temperature of the gas, and a controller in electronic communication with the P/T sensor, wherein the controller includes a processor and tangible, non-transitory memory on which is recorded instructions, such that the controller is programmed to determine a damper position of the vehicle damper based on the P/T signal received from the P/T sensor. The controller can be programmed to command the P/T sensor to transmit the P/T signal to the controller at a frequency in the range of from about 1 to 2 milliseconds, such that the controller can continuously determine the damper position. In one example, the vehicle damper is configured as a monotube damper including a damper cylinder. In one example, the gas chamber is enclosed within the damper cylinder.

In one example, the vehicle damper includes a reservoir, where the reservoir is hydraulically connected to the damper cylinder and the gas chamber is disposed within the reservoir. The reservoir can be configured as a passive reservoir, or as an electronically controlled reservoir in communication with the controller, where in this example, the controller can be further programmed to actuate the electronically controller reservoir based on the P/T signal. The gas chamber can include a first gas port, where the P/T sensor is configured to be operably attached to the gas chamber via the first gas port. In one example, the gas chamber includes an end cap configured to seal the gas chamber and the end cap includes the first gas port. The end cap can further include a second gas port configured such that the gas is injected into the gas chamber via the second gas port. In another example, the gas chamber includes an end cap configured to seal the gas chamber, wherein the P/T sensor is integral to the end cap. In this example, the P/T sensor can be configured to wireless transmit a P/T signal to the controller, or can include an electrical connector which is integral to the end cap such that the controller is in electrical communication with the P/T sensor via the electrical connector.

In one example, the damper includes a damper rod and a damper cylinder and the damper position is defined by the position of the damper rod relative to the damper cylinder. In this example, the controller can be further programmed to determine a velocity of the damper rod based on the P/T signal received from the P/T sensor, and/or to determine a direction of travel of the damper rod based on the P/T signal received from the P/T sensor. In one example, the controller is a vehicle control module configured to control a vehicle component which is not the vehicle damper, and the controller is programmed to generate a command to the vehicle component based on the P/T signal.

A method for determining a damper position of a vehicle damper is described herein. The method includes installing a pressure and temperature (P/T) sensor in direct fluid communication with gas contained in a gas chamber of a vehicle damper, where the P/T sensor is configured to measure a pressure and a temperature of the gas and to generate a P/T signal indicative of the pressure and the temperature of the gas. The method further includes providing a controller in electronic communication with the P/T sensor, wherein the controller is programmed to determine a damper position of the vehicle damper based on the P/T signal received from the P/T sensor. The method further includes measuring, via the P/T sensor, the pressure and temperature of the gas, generating, via the P/T sensor, the P/T signal, receiving the P/T signal to the controller, and determining, via the controller, the damper position of the vehicle damper.

In one example, the method further includes calibrating the P/T sensor to the vehicle damper by inputting a calibration data set to the controller, wherein the calibration data set includes a pressure, a temperature, and a volume of the gas contained in the gas chamber while the vehicle damper is in a known damper position, which may be a full rebound position.

In one example, the P/T sensor is integral to an end cap, and the method includes operably connecting the end cap to the gas chamber to seal the gas chamber. In one example, the vehicle damper includes damper cylinder and a reservoir hydraulically connected to the damper cylinder, where the gas chamber is enclosed within the reservoir, where the method further comprises installing the P/T sensor in direct fluid communication with gas contained in the gas chamber of the reservoir.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 2 is a schematic perspective view of the eRESI module of FIG. 1;

FIG. 3 is a schematic exploded view of the eRESI module of FIG. 1;

FIG. 4 is a schematic perspective view of the eRESI module of FIG. 1, showing the reservoir housing in transparent view;

FIG. 7 is a partial schematic perspective exploded view of the eRESI module of FIG. 1;

FIG. 8 is a partial schematic front exploded view of the eRESI module of FIG. 1 showing a body cap and base valve assembly of the eRESI module of FIG. 1, further showing a co-axial arrangement of the components of the base valve assembly;

FIG. 9 is a partial schematic side exploded cross-sectional view of the eRESI module of FIG. 8;

FIG. 12 is a partial schematic cross-sectional view of section A-A of FIG. 8, showing an example configuration of the body cap and base valve assembly of the eRESI module with the base valve assembly actuated to a fully closed position;

FIG. 13 is a schematic illustration of hydraulic fluid flow through the base valve assembly of FIG. 12, showing flow paths through the base valve assembly when actuated to a fully closed position;

DETAILED DESCRIPTION

Figure 1:
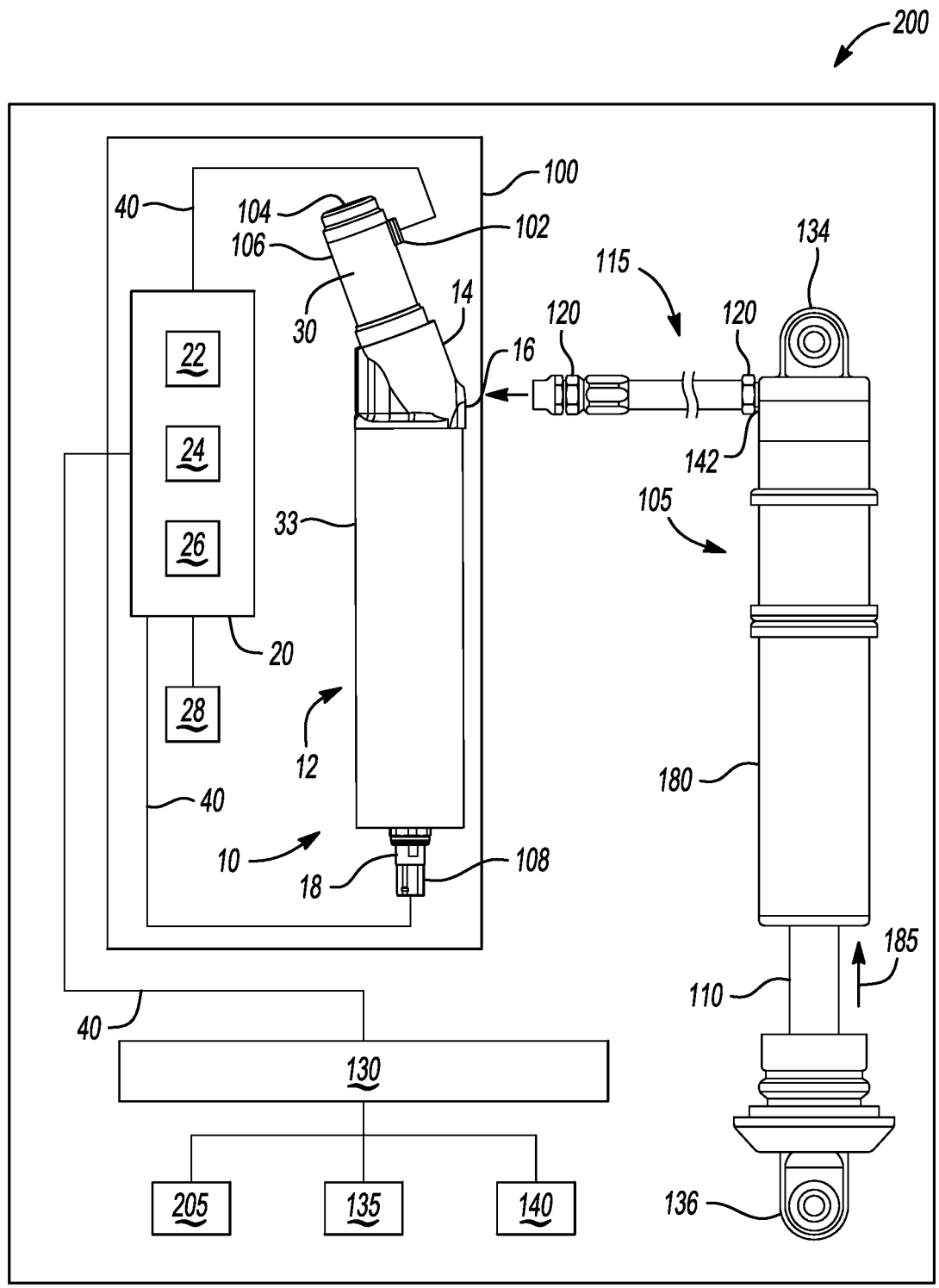
FIG. 1 is a schematic illustration of an electronically controlled external damper reservoir (eRESI) module being installed to a vehicle and to a damper on the vehicle.

The elements of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Referring to the drawings wherein like reference numbers represent like components throughout the several figures, the elements shown in FIGS. 1-23 are not necessarily to scale or proportion. FIGS. 1-15 are descriptive of a system 100 and method 150 for semi-active control of a damping force of a damper 105, using an electronically controlled external damper reservoir (eRESI) module 100, which can also be referred to herein as an eRESI system 100. FIGS. 16-23 are descriptive of a system 300 and method 250 for determining a damper position 196 of a damper 105 in real time, and for controlling, in real time, one or more vehicle components 205, including non-damper components and non-suspension components, such as headlights, using the damper position 196 determined using the system 300 and method 250. In a non-limiting example, the damper position system 300 includes the eRESI module 100 configured such that the method 250 is implemented at least in part via the eRESI module 100. Referring to FIGS. 1-23, like reference numbers represent like components throughout the several figures, and the particular dimensions and applications provided in the drawings presented herein are not to be considered limiting.

Referring to FIGS. 1-16, FIGS. 1-13 show a non-limiting example of an external damper reservoir (eRESI) module 100 including a electronically controlled external damper reservoir (eRESI) assembly 10, and an eRESI control module 20, which can also be referred to herein as the eRESI controller 20. The eRESI module 100 can include one or more eRESI sensors 18, 28 in communication with the eRESI controller 20 and/or a vehicle network 130, as further described herein. The eRESI assembly 10 includes a reservoir body cap 14 defining a reservoir port 16 configured to hydraulically connect the eRESI assembly 10 to a damper such as the damper 105 shown in FIG. 1. In an illustrative example, the damper 105 is a passive damper, such as standard monotube damper, and includes a damper cylinder 180 having a damper port 142 for connection of the damper 105 to a remote reservoir, a piston rod 110 which can also be referred to herein as a damper shaft, and a main piston valve 122 (see FIG. 18A, for example) attached to the piston rod 110 and located in the damper cylinder 180, such that, as the damper shaft 110 travels inside and relative to the damper cylinder, hydraulic fluid 114 in the damper cylinder 180 is displaced by the main piston valve 122 to generate a damping force output from the damper 105.

As shown in FIG. 1, the eRESI module 100 can be remotely connected to a damper 105, for example, via a hydraulic hose 115 attached to each of the eRESI assembly 10 and the damper 105. In the example shown in FIG. 1, the hydraulic hose 115 is terminated at each end with a hydraulic connector 120 for connecting the hydraulic hose 115 to each of the eRESI module 100 via a reservoir port 16 and to a damper 105 via a damper port 142. As used herein, a standard monotube damper can include dampers which are installed as original equipment (OE) to a vehicle 200, and/or a damper which is installed as aftermarket equipment to a vehicle 200, to replace an OE damper or other aftermarket damper. In one example, a standard monotube damper can be a generic and/or "off the shelf" damper, e.g., a damper which is available in the aftermarket for installation to a vehicle to change the damping characteristics and/or handling performance of the vehicle 200 as originally equipped. A standard damper, as that term is used herein, can refer to a passive damper 105 which may be specified for installation into at least one, or a plurality of, vehicle makes and/or models. The term vehicle, as used herein, can refer to any type or configuration of vehicle to which a dampening system including passive dampers 105 can be installed, including, for example, automobiles, trucks, off-road vehicles, all-terrain vehicles, motorcycles, snowmobiles, track racing vehicle, bicycles, utility task vehicles, etc.

As further described herein the eRESI module 100, when hydraulically connected to a standard damper 105, converts the standard damper 105 into a semi-active variant, also referred to herein as an eRESI controlled damper, by dynamically controlling, e.g., changing, the damping force outputted by the damper 105 by dynamically and selectively adjusting a variable base valve assembly 50 in the eRESI reservoir 10 of the eRESI module 100, using an actuator 30 in the variable base valve assembly 50 of the eRESI assembly, where the actuator 30 is actuated by an eRESI controller 20 in response to inputs received by the eRESI controller 20. In one example, the actuator 30 includes an electronic solenoid. In one example, the actuator 30 includes a voice coil actuator (VCA). Inputs received by the eRESI controller 20 can include, in a non-limiting example, inputs received from one or more sensors, modules and/or components, including one or more pressure/temperature (P/T) sensors 18, one or more eRESI sensors 28, one or more vehicle sensors 135, one or more vehicle modules 140, and/or one or more vehicle components 205. The P/T sensors 18, eRESI sensors 28, and vehicle sensor 135 can be individually and/or collectively referred to herein as input sensors, such that the signals and/or outputs generated by any of the sensors 18, 28, 135 can be individually and/or collectively referred to herein as input signals.

Figure 15:
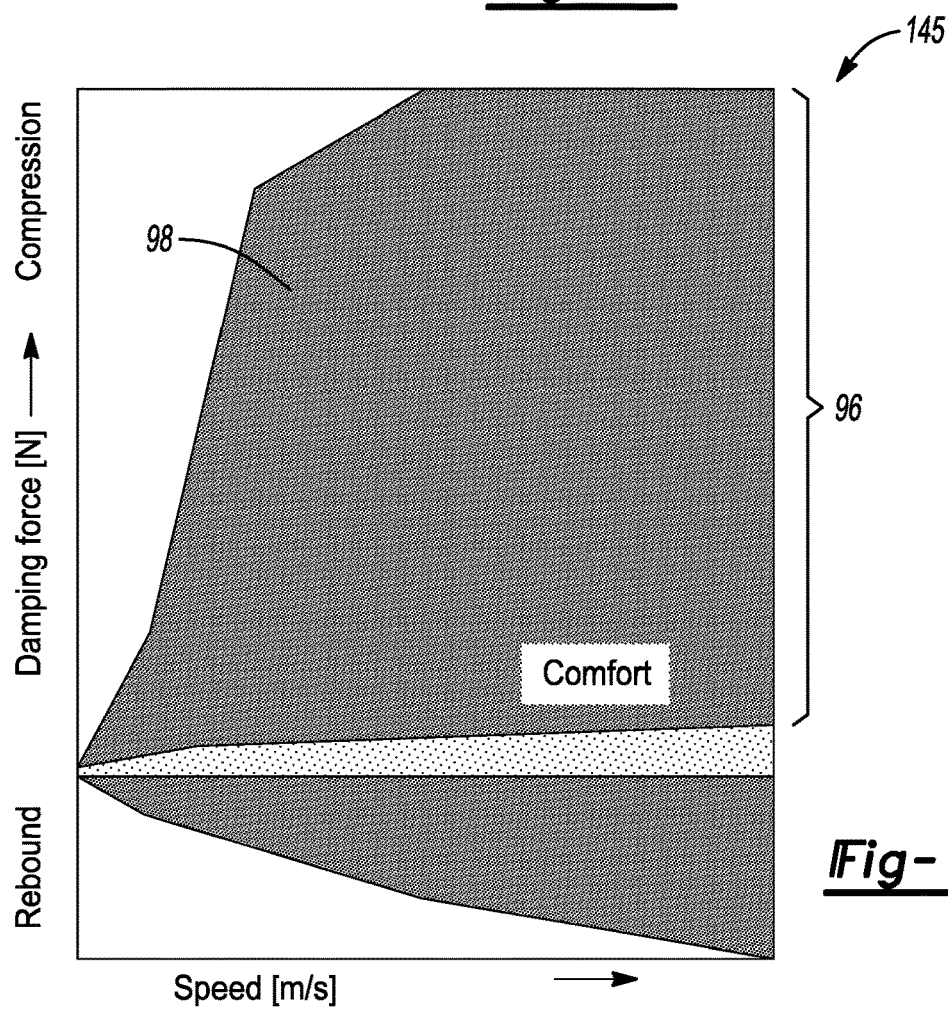
FIG. 15 is a schematic illustration of a force velocity curve showing damping force versus speed of piston rod travel in a damper controlled by the eRESI module connected thereto, and further showing a range and area of compressive damping force which can be generated in the damper by actuation of the eRESI module hydraulically connected to the damper as shown in FIG. 1.

Referring again to FIG. 1, in use, the damper shaft 110 travels in the direction of arrow 185 shown in FIG. 1, in response to a compressive load exerted on the damper shaft 110 in the direction of arrow 185, for example, a road load, vehicle load, or other suspension load exerted on the damper shaft 110 causing travel of the damper shaft 110 into the damper cylinder 180, Travel of the damper shaft 110 in the direction of arrow 185, e.g., in compression, causes the damper 105 to generate a compressive damping force in response to the compressive load on the damper shaft 110, generated by movement of the main piston valve 122 connected to the damper shaft 110 against the hydraulic fluid 114 contained in a damper oil chamber 118 (see FIGS. 18A-18B), where the compressive movement of the damper shaft 110 and main piston valve 122 displaces hydraulic fluid 114 from the damper cylinder 180 to the remotely attached eRESI assembly 10 via the damper port 142, hydraulic hose 115 and reservoir port 16. Hydraulic fluid 114 can also be referred to herein as working fluid, or as hydraulic oil or oil 114. The eRESI module 100 can selectively control and/or modify the compressive damping force outputted from the attached damper 105, in a non-limiting example, by adjusting the preload of a base valve shim stack in a variable base valve assembly 50 in the eRESI assembly 10, through selective actuation of the actuator 30 to selectively change the flow rate of the hydraulic fluid 114 from the damper 105 into the eRESI assembly 10, to create a pressure differential insider the damper cylinder 180, thus controlling the damping force output of the eRESI controlled damper 105 during the compressive event, as further described herein. In one example, the actuator 30 is actuable between a fully closed valve position (see FIGS. 12-13) and a fully open valve position (see FIGS. 10-11), as further described herein, where in a partially or fully closed valve position, the flow of hydraulic fluid 114 displaced from the damper 105 into the eRESI assembly 10 is restricted such that the pressure differential inside the damper cylinder 180 is increased, thus increasing the compressive damping force outputted from the damper 105. In a non-limiting example, the eRESI module 100 is configured such that the compressive damping force outputted from the damper 105 can be increased in a range of five to ten times the baseline damping force of the damper 105, where the baseline damping force, as that term is used herein, refers to the compressive damping force which would be generated by the damper 105 when not modified by connection to the eRESI module 100 disclosed herein. For example, the baseline damping force is the compressive damping force which would be generated by the damper 105 when connected to a passive reservoir. In a non-limiting example, the eRESI module 100 can be configured to restrict flow into the eRESI assembly 10 such that the compressive damping force outputted from an eRESI controlled damper 105 can be up to 1000 pounds force, e.g. a five-fold increase over a baseline damping force of 200 pounds, or a ten-fold increase over a baseline damping force of 100 pounds. See FIG. 15, showing a range 96 of the increased damping force which can be dynamically adjusted within an area 98 over a range of piston rod velocity.

The base valve assembly 50 of the eRESI assembly 10 described herein is advantaged by its configuration as a variable base valve assembly, and is distinguished from a traditional base valve assembly by including an additional hydraulic circuit which can be actuated by the actuator 30 infinitely between fully closed, partially closed, neutral, partially open, and fully open conditions such that the actuator can infinitely meter fluid flow and pressure to the base valve piston 56 (see FIG. 8) by piloting the base valve restriction with a hydraulically controlled restrictor 54 (see FIG. 8). As shown in FIGS. 5 through 13, the restrictor piston 54 and associated hydraulic circuit is integrated in the variable base valve assembly 50, such that the restrictor piston 54 is coaxial with the base valve piston 56 and cartridge 52. The actuator 30 pilots the restrictor piston by controlling fluid flow through the cartridge 52, such that the actuator 30 works in conjunction with the base valve piston 56 to infinitely meter fluid flow and pressure and thus variably control the compressive force output of the eRESI controlled damper 105 within the compressive dampening force area 98 of the damping force-velocity curve shown in FIG. 15, and such that the response time for the damper 105 to respond to changes in operating conditions, such as changes in road inputs, vehicle loads, etc., is minimized, e.g., a relatively quicker response time is achieved. The quicker response time can be attributed at least in part, for example, to the cumulative response of the traditional portion of the eRESI base valve assembly 50, e.g., the response of the base valve piston 56, and the response of the restrictor piston 54 piloted by the actuator 30, where these pistons are coaxial configured to provide a cumulative control. In one example, the control loop illustrated by the method shown in FIG. 14 can be executed at a frequency of 1 to 2 milliseconds per loop such that the eRESI controller 20 can output a control signal to the actuator 30 every 1 to 2 milliseconds, to substantially continuously pilot the restrictor valve 54 in response to inputs received by the eRESI controller 20 from at least one of P/T sensor 18, eRESI sensors 28, vehicle sensors 135 and/or vehicle modules 140.

Referring to FIG. 1, shown is a non-limiting and illustrative example of an eRESI module 100 being installed to a vehicle 200 and hydraulically connected to a damper 105 on the vehicle 200 so as to provide semi-active control of the damper 105 using the eRESI module 100. The vehicle 200 includes the damper 105, which in the illustrative example is a passive damper and in the example shown, is a mono-tube damper including a damper port 142 to which a hydraulic hose connector 120 can be attached to fluidly connect a hydraulic hose 115 to the hydraulic cylinder 180 of the damper 105 via the damper port 142. The damper 105 includes a damper piston rod 110, also referred to herein as a damper shaft, which is partially disposed in and connected to a main piston valve 122 (see for example, FIG. 18A) disposed in a damper oil chamber 118 in the hydraulic cylinder 180 of the damper 105, such that when subjected to a compressive force input, the damper shaft 110 travels in the direction of arrow 185 to compress hydraulic fluid 114 in the damper oil chamber 118 and out of the damper cylinder 180 via the damper port 142 to a reservoir hydraulically connected to the damper 105 via the hydraulic hose 115. In the present example, the damper 105 is connected to an eRESI assembly 10 via a connector 120 of the hydraulic hose 115 connected to a reservoir port 16, also referred to herein as a high pressure port 16, of the eRESI assembly 10. When the compressive force applied to the damper shaft 110 is reduced or substantially eliminated, as when the vehicle 200 is in full rebound, the pressure differential in the damper cylinder 185 acts on the main piston valve such that the damper shaft 110 travels in a direction opposite the arrow 185, drawing hydraulic fluid from the reservoir, e.g., from the eRESI assembly 10, into the damper cylinder 185.

The vehicle 200 can further include one or more vehicle sensors 135, vehicle modules 140, and/or vehicle components 205 installed to the vehicle 200 as original equipment, which can be in communication with a vehicle network 130, such as a CAN bus, and such that data and/or other inputs received from the vehicle sensors 135, modules 140 and/or components 205 can communicate with, including transmitting and/or receiving data and/or other information through the vehicle network 130, devices connected to the vehicle network 130, including, for example, the eRESI module 100, controller 20, P/T sensor 18, and/or other eRESI sensors 28. In one example, referring to FIG. 23, the transmitted data can include at least one or a combination of steering input, throttle data 184, vehicle speed 182, wheel speed, acceleration 194, braking, braking force, braking angle, gyro outputs 192 including gyro data 192 including inertia, pitch, roll, yaw, g-force, etc., damper shaft speed, damper shaft position 196, lateral and/or longitudinal accelerometer data 194, etc., which can be used to determine vehicle operating conditions, driver intent, and road input to the suspension system of the vehicle 200 including the damper 105. In a non-limiting example, the eRESI module 100 can be installed to the vehicle 200 such that the eRESI controller 20 is connected to one or more of the vehicle network 130, one or more of the vehicle sensors 135, and one or more of the vehicle modules 140, such that the eRESI controller 20 can receive and/or transmit data and/or other information for use by the eRESI controller 20 in controlling the damper 105, via dynamic actuation of the actuator 30, to selectively control base valve restriction of the variable base valve assembly 50 of the eRESI assembly 10. Referring to FIG. 1, in a non-limiting example, the eRESI controller 20 includes a memory 22, which includes tangible, non-transitory member, a central processing unit (CPU) 24, and a communication module 26, which can be used to receive, process and/or store data received from the vehicle network 130, sensors 135, vehicle modules 140 and/or vehicle components 205. In one example, one or more damping algorithms and/or instructions are stored to the memory 22 and are applied by the CPU 24 to vehicle data to generate a control signal communicated to the actuator 30 to control actuation of the actuator 30 and variable base valve assembly 50. In one example, the communication module 26 includes a CAN transceiver for communicating with the vehicle network 130, which can be configured as a CAN bus. The CPU 24 can be configured for executing the one or more algorithms which can be stored, for example, in memory 24 of the controller 20. The memory 24, at least some of which is tangible and non-transitory, may include, by way of example, ROM, RAM, EEPROM, etc., of a size and speed sufficient, for example, for executing the algorithms, storing and accessing look-up tables which can include empirical data for use by the algorithms in generating a control signal for actuating the actuator 20, for determining the damper rod position 196 (as further described herein) and/or for communicating with one or more of the network 130, sensors 18, 28, 145, modules 140, components 205, etc. Data collected from the vehicle 200 can include, for example, vehicle speed 182, throttle position 184, brake data, steering wheel angle, and/or wheel position data, etc. (see FIG. 23) which can be used by the algorithms, the eRESI controller 20 and/or the modules 140 to determine vehicle status and/or to infer driver intent, and/or to generate and output a control signal to the actuator 30.

In the examples shown in FIG. 1 and in further detail in FIGS. 2-13, the eRESI module 100 includes an eRESI reservoir assembly 10 and an eRESI control module 20. The eRESI control module 20 can be referred to herein as an eRESI controller 20. In one configuration, the eRESI module 100 can include one or more sensors 18, 28 for sensing, directly and/or indirectly, at least one of vehicle operating conditions and/or damper operating conditions, such that the eRESI module 100 can function to control the standard damper 105 to which it is connected without any input from the vehicle network 130 and without any direct input from the damper 105 to which it is connected. The eRESI assembly 10 includes a reservoir body 12 connected to a body cap 14, for example, by a threaded interface, such that the reservoir body is sealably connected to the body cap 14 at the threaded interface. The eRESI assembly 10 includes an actuator housing 106 which includes an eRESI connector terminal 102 configured to receive an electrical connector 40, such as a wiring harness, such that the actuator 30 can be connected to the controller 20 via the connector 40 and connector terminal 102. In another configuration, the actuator 30 and controller 20 can be wirelessly connected. In the example shown, the actuator housing 106 is retained to the body cap 14 by a locking nut or end cap 104, to enclose the actuator 30 and base valve assembly 50 within the eRESI assembly 10.

Figure 5:
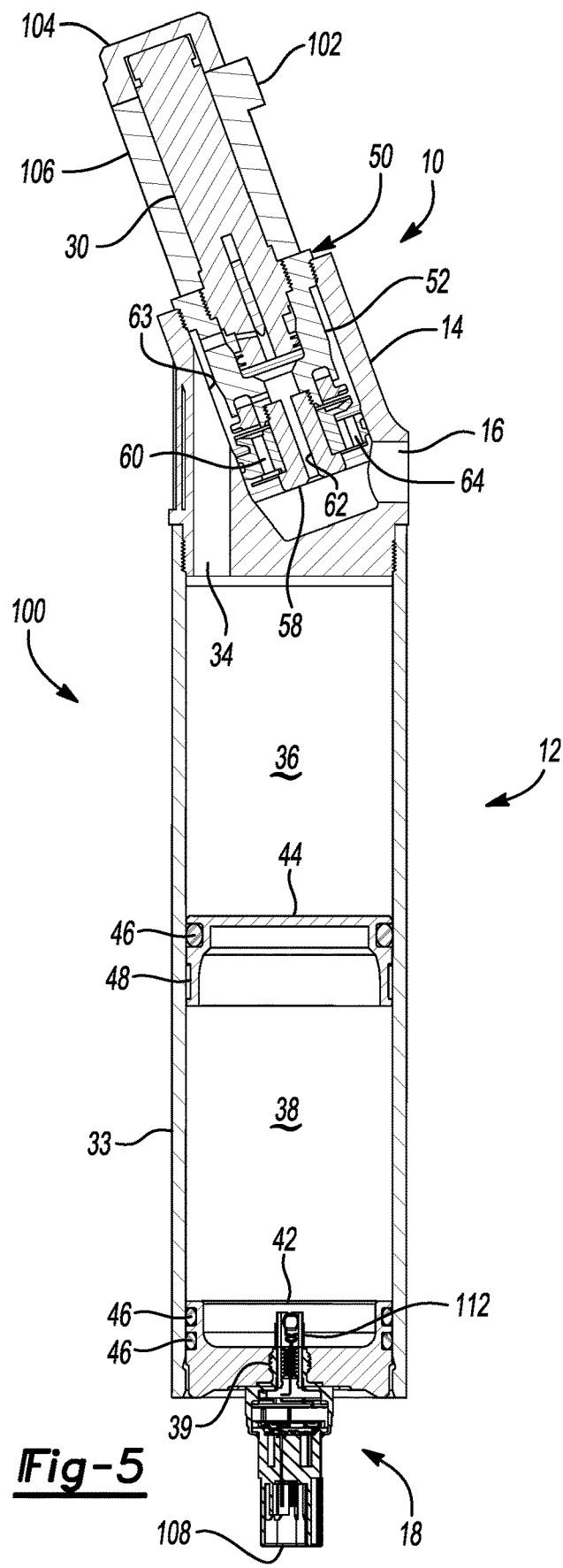
FIG. 5 is a schematic cross-sectional view of section A-A of FIG. 8, showing an example configuration of the eRESI module of FIG. 1.
Figure 6:
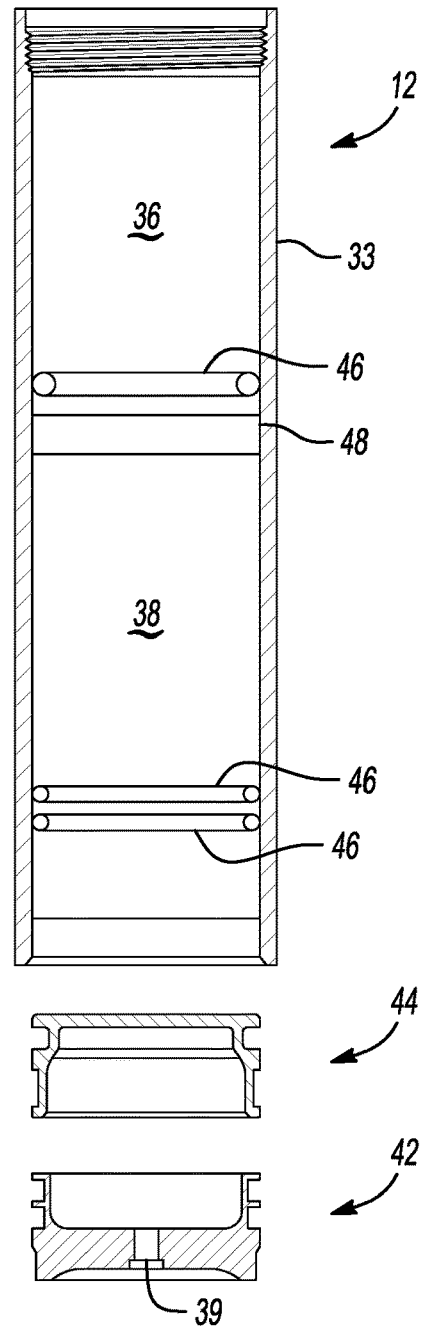
FIG. 6 is an exploded partial schematic cross-sectional view of section A-A of FIG. 8, showing a reservoir housing portion of the eRESI module of FIG. 1.
Figure 17:
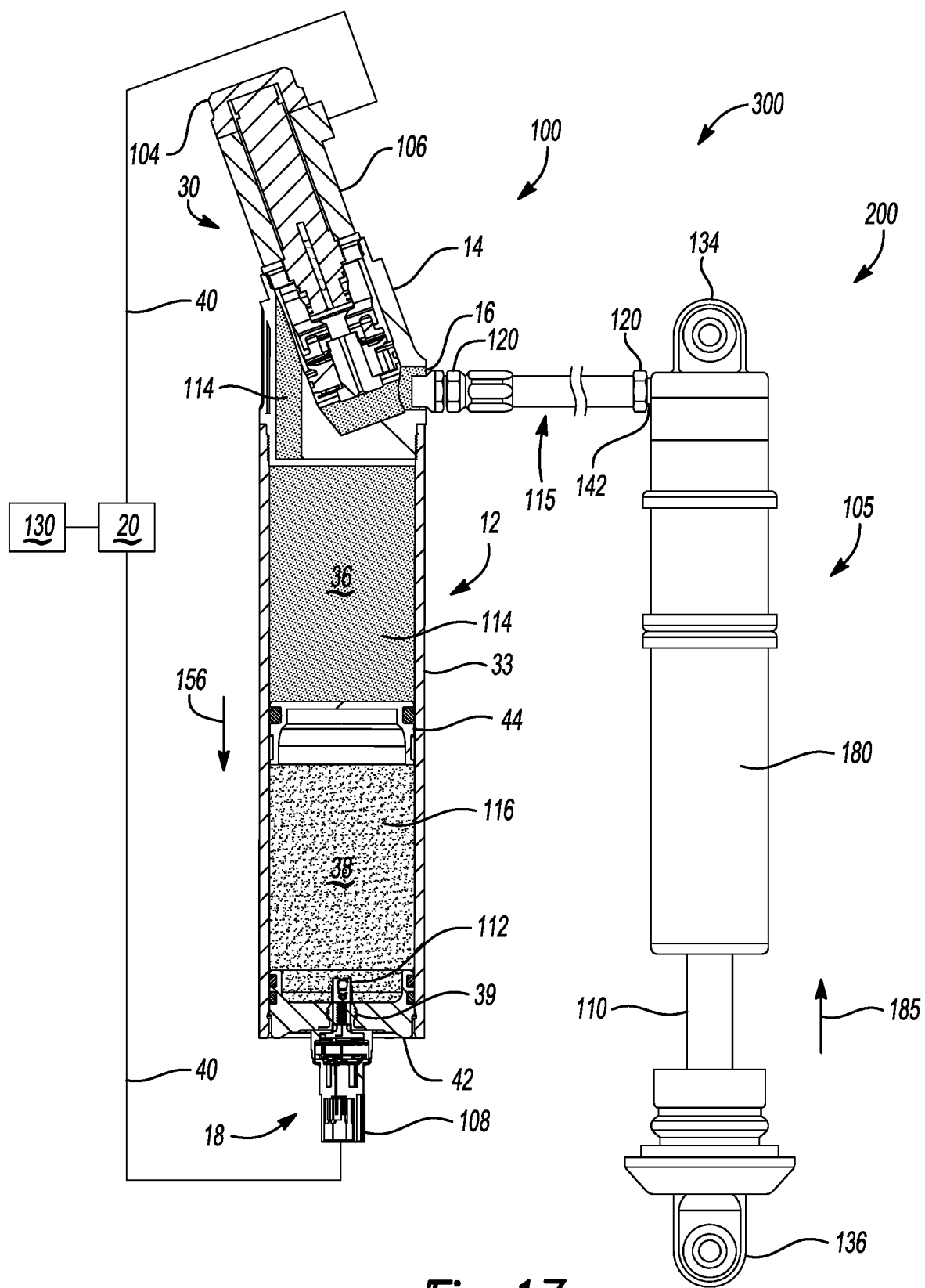
FIG. 17 is a schematic illustration of an example configuration of the damper position system of FIG. 16 including an eRESI module in fluid communication with a damper and in communication with the vehicle network of FIG. 16.

As shown in FIGS. 4, 5 and 6, the reservoir body 12 includes a reservoir housing 33, which can be cylindrical or tubular, which includes an end cap 42 attached to the reservoir housing 33 to seal and/or enclose the open end of the reservoir housing 33. A floating piston 44 is positioned in the interior of the reservoir housing 33 and can include one or more of piston seals 46, which can be O-rings, and/or piston rings 48, for sealing the floating piston 44 to the interior wall of the housing 33. The floating piston 44 is configured to float, e.g., to move along axial length of the housing 33 (see arrow 156 in FIG. 17), in response to a pressure differential between gas 116 contained in a gas chamber 38 defined between the floating piston 44 and the end cap 42, and hydraulic fluid 114 contained a hydraulic fluid chamber 36 defined between the floating piston 44 and the body cap 14, as shown in FIGS. 4-6 and FIG. 17. In use, the gas chamber 38 is filled with a compressible gas 116 (see FIG. 17), which in one example is nitrogen gas and the hydraulic fluid chamber 36 is filled with hydraulic fluid 114, also referred to herein as oil, hydraulic oil, and/or working fluid. In use, the relative volumes of the hydraulic fluid chamber 36 and the gas chamber 38 change dynamically as the floating piston moves along the axial length of the housing 33 in response to the flow of hydraulic fluid 114 via the reservoir port 16 and base valve assembly 50. Referring to FIG. 17, axial movement of the floating piston 44 in the direction of arrow 156, for example, in response to compression of the piston rod 110 in the direction of arrow 185, causes a relative decrease in the volume of the gas chamber 38 and a relative increase in the volume of the oil chamber 36, compressing the gas 116 in the gas chamber 38 such that the pressure of the gas 116 in the gas chamber 38 increases, where the increase in the pressure of the gas 116 is proportional to the axial movement of the floating piston 44, and such that the measured pressure and temperature of the gas 116 in the gas chamber 38 is predictive, in real time, of the axial position of the floating piston 44 in the reservoir housing 33, and such that the rate of change in the pressure of the gas 116 in the gas chamber 38 is predictive of the velocity of movement of the floating piston 44. Likewise, axial movement of the floating piston 44 in the direction opposite the arrow 156, for example, in response to extension of the piston rod 110 in the direction opposite the arrow 185, causes a relative increase in the volume of the gas chamber 38 and a relative decrease in the volume of the oil chamber 36, decompressing the gas 116 in the gas chamber 38 such that the pressure of the gas 116 in the gas chamber 38 decreases, where the decrease in the pressure of the gas 116 is proportional to the axial movement of the floating piston 44, and such that the measured pressure and temperature of the gas 116 in the gas chamber 38 is predictive, in real time, of the axial position of the floating piston 44 in the reservoir housing 33 and such that the rate of change in the pressure of the gas 116 in the gas chamber 38 is predictive of the velocity of movement of the floating piston 44.

Figure 24:
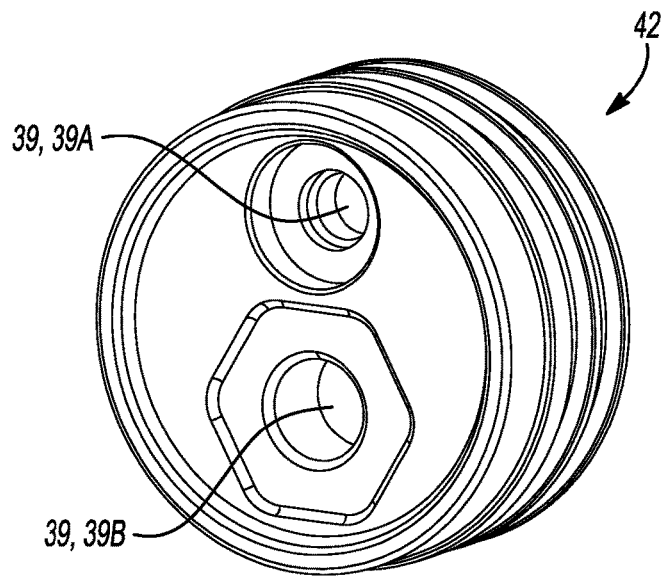
FIG. 24 is a schematic illustration of a perspective view of an end cap for sealing the gas chamber, the end cap including a first port via which gas is injected into the gas chamber, and a second port for attaching the P/T sensor.

As shown in FIGS. 3-6, the reservoir body 12 includes at least one gas port 39 in fluid communication with the eRESI gas chamber 38, for injecting gas 116 into the gas chamber 38. One or more gas ports 39 can be located in the end cap 42. A gas port 39 could be located, for example, in a portion of the housing wall 33 defining the gas chamber 38. In one example, a valve such as a Schrader valve can be inserted into the gas port 39 for injection of the gas 116 into the gas chamber 38 and sealing of the gas port 39. In another example, a plug or seal can be inserted into the gas port 29 to seal the gas chamber 38 after the injection of the gas 116 in a predetermined amount and/or pressure into the gas chamber 38. In one example, a P/T sensor 18 is inserted into the gas port 29 such that a sensing interface 112 of the P/T sensor 18 can sense the pressure and temperature of the gas in the gas chamber 38. In one example, the P/T sensor 18 can be integrated with the gas filling valve. In one example, the reservoir housing 33 and/or the reservoir end cap 42 (see FIG. 24) can include a first gas port 39A for receiving a valve, such as a Schrader valve, configured for injecting gas 116 into the gas chamber 38, and a second gas port 39B for receiving the P/T sensor 18.

Figure 25:
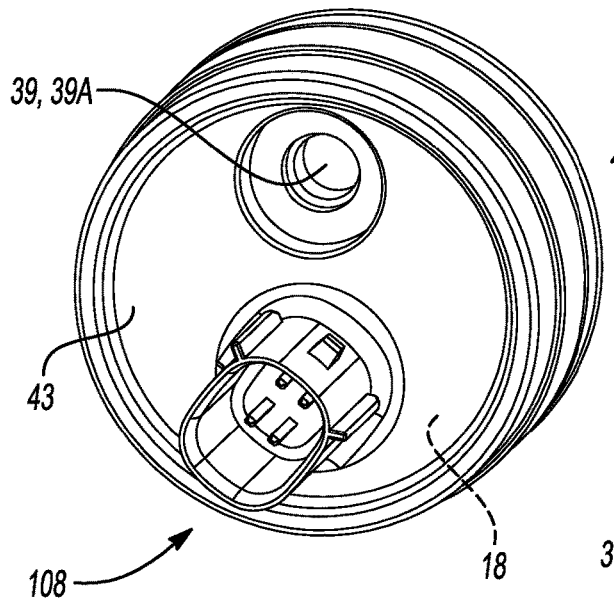
FIG. 25 is a schematic illustration of a perspective view of an exterior surface of an end cap for sealing the gas chamber, the end cap including a gas port via which gas is injected into the gas chamber, and further including a P/T sensor integrated into the body of the end cap and including an electrical connector integral to the end cap.
Figure 26:
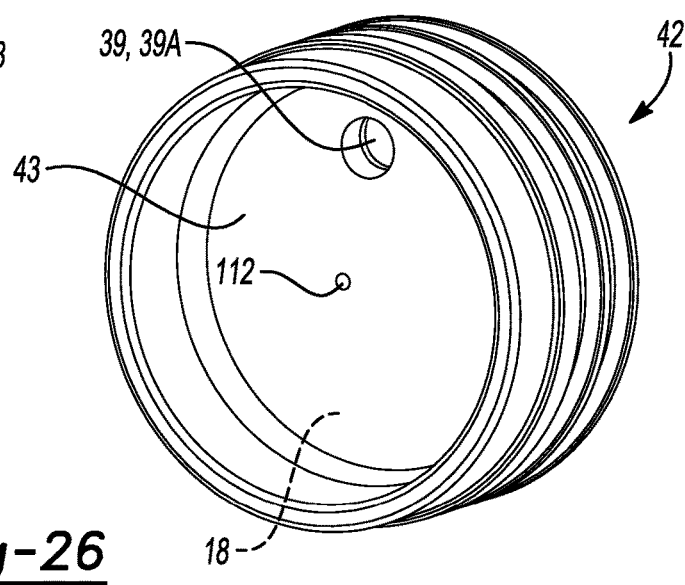
FIG. 26 is a schematic illustration of a perspective view of an interior surface of the end cap of FIG. 25, including an orifice in communication with the P/T sensor, such that gas flows via the orifice to a P/T sensing interface of the P/T sensor integrated into the body of the end cap.

FIGS. 25 and 26 illustrate another non-limiting example including an end cap 42 which a gas port 39, 39A for receiving a valve, such as a Schrader valve, configured for injecting gas 116 into the gas chamber 38, and a P/T sensor 18 which is integrated into the body 43 of the end cap 42. In one example, the end cap 42 is formed, for example, by molding, such that the P/T sensor 18 is encapsulated in the body 43 of the end cap 42 and the P/T sensor connector 108 is integral to the end cap 42, protruding outwardly from the exterior surface of the end cap 42 in the non-limiting example shown in FIG. 25, and such that the connector 108 is conveniently located for connection to a wiring harness 40. As shown in FIG. 26, the interior facing surface of the end cap 42 of FIG. 25, e.g., the surface in fluid communication with the gas 116 in the gas chamber 38, includes an orifice defining a P/T sensing interface 112 in communication with the P/T sensor 18 encapsulated in the body 43 of the end cap 42, such that the gas 116 flows from the gas chamber 28 via the orifice to a P/T sensing interface 112 of the P/T sensor 18 integrated into the body of the end cap, and such that the temperature and pressure of the gas 116 can be measured by the P/T sensor 18. The end cap 42 including the integral P/T sensor 18 shown in FIGS. 25 and 26 is advantaged by encapsulating the P/T sensor 18 in the end cap 42 and integrally forming the connector 108 to the end cap 42, such that the P/T sensor 18 and connector 108 is shielded by the end cap 42 from contamination, impact, etc. when installed to the vehicle to minimize potential for damage to or dislodgement of the P/T sensor 18 from the eRESI assembly 10. As further described herein, the end caps 42 shown in FIGS. 24-26 can also be installed directly to a passive reservoir 144 and/or to a damper cylinder for determining a damper position.

The P/T sensor 18 can include a pressure transducer and temperature sensor for detecting the pressure and temperature of the gas 116 in the gas chamber 38 in real time and for transmitting pressure and temperature data as a P/T signal from the P/T sensor 18 to the eRESI controller 20 and/or to the vehicle network 130 and/or to one or more vehicle modules 140 in the vehicle 200 in real time. In a non-limiting example, the P/T sensor 18 includes a sensor terminal 108 and is connected to the eRESI controller 20 and/or the vehicle network 130 via an electrical connector 40, such as a wiring harness, connected to the sensor terminal 108. The P/T sensor 18 can be configured to wirelessly transmit pressure and temperature data, for example, via radio frequency (RF) technology, such that the pressure and temperature data, which is also referred to herein as a P/T signal, could be read directly by the controller 20 and/or any module 140 in the vehicle 200. The examples are non-limiting, e.g., the P/T sensor 18 could be analog, digital, networked (i.e., smart via CAN, Ethernet, etc.), wireless, optical or any other similar technology.

In a non-limiting example, the eRESI controller 20 dynamically, e.g., in real time, receives gas pressure and/or temperature data from the P/T sensor 18, and applies one or more algorithms to the data from the P/T sensor 18 and or a combination of data from the P/T sensor 18 and one or more of the sensors 28, modules 140, and/or vehicle components 205, for use by the eRESI controller 20 in controlling via dynamic actuation of the actuator 30 to selectively control base valve restriction of the variable base valve assembly 50 of the eRESI assembly 10, thereby selectively controlling the damping force of the damper 105, without any input from the vehicle network 130 and without any direct input from the damper 105 to which it is connected.

Referring again to FIG. 1, an eRESI sensor 28 can be installed on and/or incorporated into the eRESI module 100, the eRESI controller 20, and/or eRESI assembly 10, to provide additional sensor input to the eRESI controller 20 for, example, as an input to the damping control algorithm and to actuate in real time a damping force in response to the sensor input. In one example, the eRESI sensor 28 is configured as an inertial measurement unit (IMU) for sensing the inertia of the eRESI module 100. The eRESI sensor 28 is in communication with the eRESI controller 20, via an electrical connector 40, and/or wirelessly. The eRESI sensor 28 can be mounted to the controller 20, to the eRESI assembly 10, or to a remote location, for example, on the damper 105, in the suspension module 215 (see FIG. 16) or elsewhere on the vehicle 200. The eRESI controller 20 dynamically, e.g., in real time, receives inertia data from the eRESI IMU sensor 28, and applies one or more algorithms, for example, to determine vehicle speed, roll, pitch, yaw, position, etc., and/or to infer driver intent, such that the IMU data can be used by the eRESI controller 20 to generate a dynamic actuator control signal outputted to the actuator 30 for real time control of the damping force generated by the damper 105 via selective control of base valve restriction of the variable base valve assembly 50 of the eRESI assembly 10. In one example, the eRESI controller 20 uses a combination of the inertia data received from the eRESI sensor 28 and the damper position and velocity data determined from the P/T signal received from the P/T sensor 18 to generate the actuator control signal outputted to the actuator 30 to selectively control the flow of hydraulic fluid 114 through the variable base valve assembly 50 in real time, thus controlling the damping force outputted by the damper 105 in real time and in response to the damper position and rate of movement of the damper rod (damper rod velocity) determined from the P/T signal and other vehicle inertia data received from the eRESI sensor 28.

Referring again to FIGS. 5 and 7-13, the body cap 14 of the eRESI assembly 10 houses the variable base valve assembly 50, as shown in FIGS. 5 and 7-13, and defines the reservoir port 16 through which hydraulic fluid 114 flows between the fluid chamber 36 of the reservoir body 12 and the damper oil chamber 118 within the damper cylinder 180 of the damper 105, via the hydraulic hose 115. As shown in FIG. 5, during compression of the damper shaft 110 in the direction of arrow 195 (see FIG. 1), hydraulic fluid 114 flows from the damper 105 via the hydraulic hose 115 to the eRESI assembly 10, and enters the variable base valve assembly 50 via a central port 60 defined by a central locking bolt 58 of the valve assembly 50 (see flow path 86 shown in FIGS. 11 and 13), and via a check shim 68 and a compression port 62 defined by a base valve piston 54 of the valve assembly 50 (see flow path 84 shown in FIGS. 11 and 13). As shown in FIG. 5, when the damping system goes into rebound, e.g., when the compression of the damper 105 is reduced and/or eliminated such that the pressure differential in the damper 105 causes travel (extension) of the damper shaft 110 in a direction opposite arrow 185, hydraulic fluid 116 flows from fluid chamber 36 via a chamber port 34 defined by the body cap 14, and via a rebound port 64 in the base valve piston 56 to return to oil chamber 118 of the damper cylinder 180 via the hydraulic hose 115.

Figure 11:
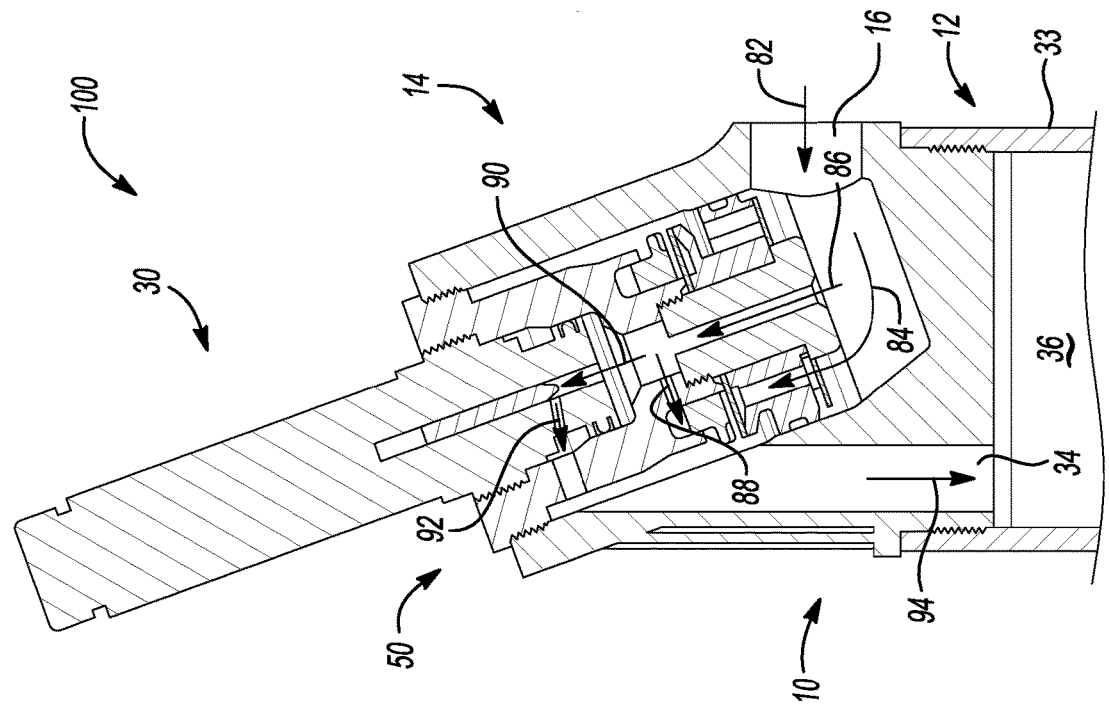
FIG. 11 is a schematic illustration of hydraulic fluid flow through the base valve assembly of FIG. 10, showing flow paths through the base valve assembly when actuated to a fully open position.
Figure 10:
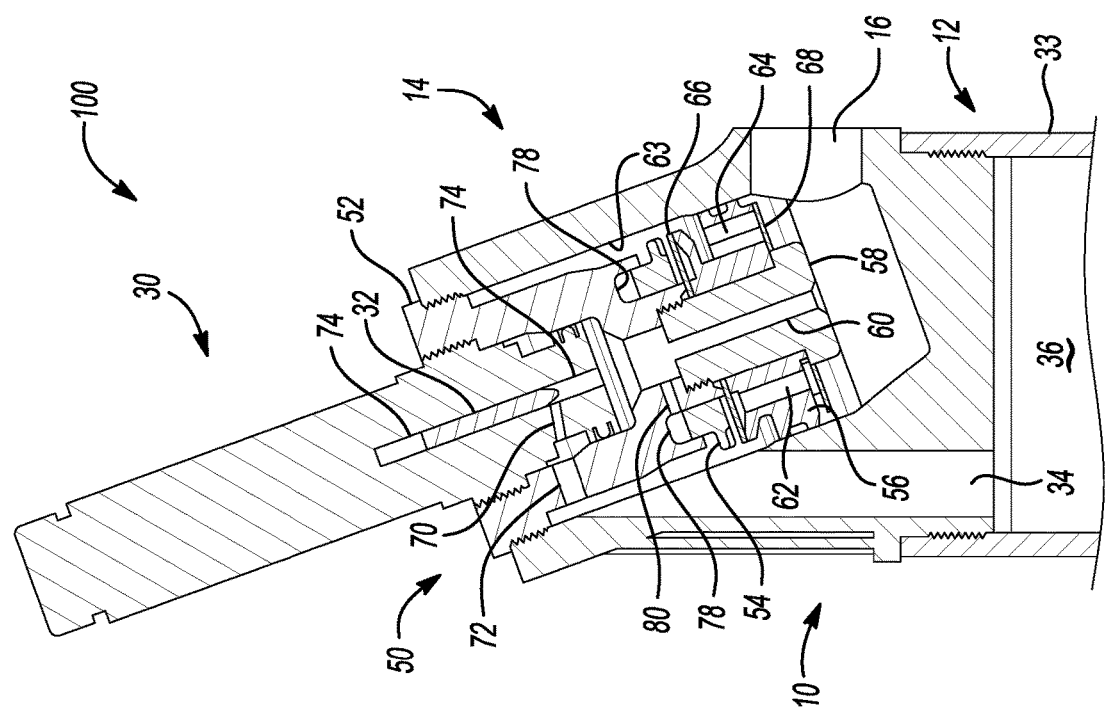
FIG. 10 is a partial schematic cross-sectional view of section A-A of FIG. 8, showing an example configuration of the body cap and base valve assembly with the base valve assembly actuated to a fully open position.

Referring to FIGS. 7-13, the component configuration and arrangement of the components of the base valve assembly 50, and the operation of the variable base valve assembly 50, are shown in additional detail. As shown in the drawings, the variable base valve assembly 50 includes an actuator 30 including an armature 32 disposed in and movable relative to an armature passage 74 in response to a control signal received by the actuator 30 from the eRESI controller 20, where in response to the control signal, the armature 32, configured as a pintle in the example shown, is moved between a fully retracted position shown in FIG. 10 and a fully extended position shown in FIG. 12. As shown in FIGS. 10 and 11, with the armature 32 actuated to a fully retracted position, an actuator port 70 is fully open in the actuator 30, corresponding to a fully open valve position of the valve body 50 shown in FIG. 11, and fluid is flowable through the actuator port 70 from the central bore 63 of the cartridge 52 via the armature passage 74 (see flow path 90 shown in FIGS. 11 and 13). As shown in FIGS. 12 and 13, with the armature 32 actuated to a fully extended position, the actuator port 70 is fully sealed, e.g., fully closed, corresponding to a fully closed valve position of the base valve assembly 50 shown in FIG. 13.

The actuator 30 is seated in and attached to a central bore 63 of a valve cartridge 52, for example, via a threaded interface as shown in FIGS. 5 and 10. The valve cartridge 52 is seated in a central bore 63 of the body cap 14 and is attached to the body cap 14, for example, by a threaded interface as shown in FIGS. 5 and 10. The valve cartridge 52 defines a blow-off port 72 through which hydraulic fluid 114 flows from the central bore 63 of the valve cartridge 52 to the chamber port 34 (see flow path 92 shown in FIGS. 11 and 13), and through the chamber port 34 to the fluid reservoir 36 (see flow path 94 shown in FIGS. 11 and 13). The valve cartridge 52 further defines a cartridge port 80 through which fluid flows from the central bore 63 of the cartridge 52 to an annular groove 78 formed in the cartridge 52 as shown in FIG. 9 (see flow path 88 shown in FIGS. 11 and 13).

The valve body 50 further includes a restrictor piston 54 which is disposed axially between the cartridge 52 and the base valve piston 56, as shown in the figures. In the example shown, a deflection disk 66 is disposed axially between the restrictor piston 54 and the base valve piston 56. A locking bolt 58 defining a central port 60 is seated in the base valve piston 56 and attached to the cartridge 52 by a threaded interface, as shown in the figures, such that with the locking bolt 58 attached to the cartridge 52, the restrictor piston 54, the deflection disk 66 and the base valve piston 56 are retained in their relative positions as shown in FIG. 10, for example, with the base valve piston 56 seated into and sealed to the central bore 63 of the body cap 14 such that hydraulic fluid 114 entering via the reservoir port 16 (see flow path 82 shown in FIGS. 11 and 13) is directed through the central port 60 and compression port 68 and is prevented from flowing between the base valve piston 58 and the bore wall of the body cap 14. As shown in FIGS. 10 and 11 compared with FIGS. 12 and 13, the restrictor piston 54 and the deflection disk 66 can move axially relative to the cartridge 52 and the base valve piston 56, each of the latter being fixedly attached to the central bore 63 of the body cap 14, where axial movement of the restrictor piston 54 and the deflection disk 66 occurs in response to pressure differential in the variable base valve assembly 50, and where the pressure differential can be selectively induced by actuation of the actuator 30. The various components 30, 52, 54, 56, 58, 66, 68 are arranged and assembled in the base valve assembly 50 such that the various components 30, 52, 54, 56, 58, 66, 68 are coaxial to each other and to a base valve assembly axis 76, as shown in FIGS. 7-9. As such, the base valve piston 56 and the restrictor piston 54 act in series with each other to control and/or restrict fluid flow through the variable base valve assembly 50.

Figure 14:
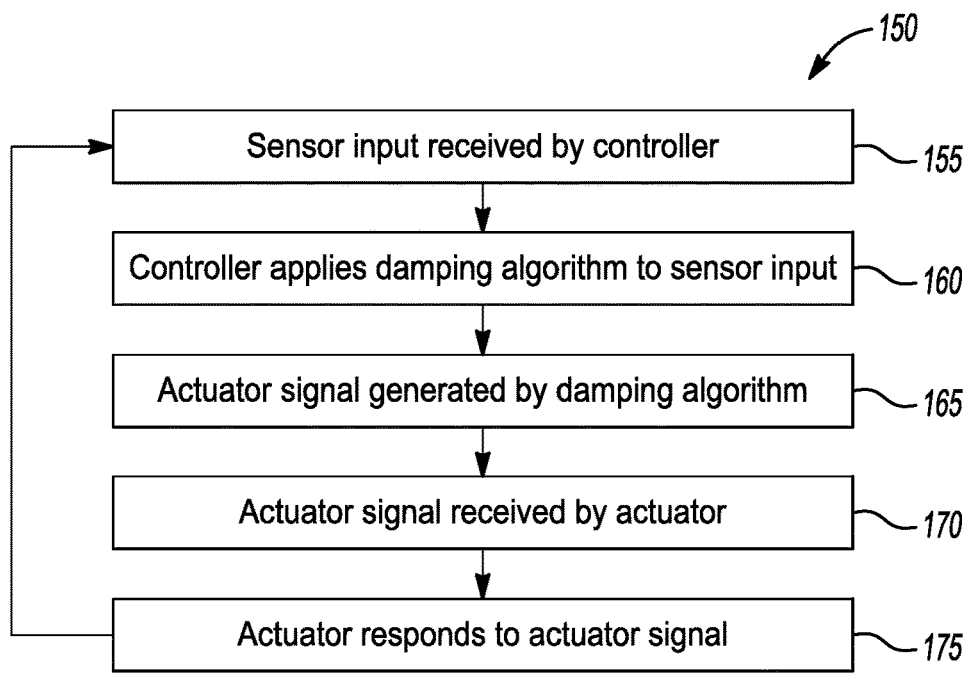
FIG. 14 is a flow chart illustrating a method for semi-active control of a damping force of a damper hydraulically connected to the eRESI module of FIG. 1.

Operation of the variable base valve assembly 50 is shown in FIGS. 10-13, where actuation of the actuator 30 occurs in response to an actuator control signal, also referred to herein as an actuator signal, generated by the eRESI controller 20 using, for example, a semi-active damping method 150 shown in FIG. 14, where the method 150 and steps 155, 160, 165, 170, and 175 can also be referred to herein as a control loop executed by the eRESI controller 20. Referring to FIG. 14, the method 150 includes, at step 155, receiving sensor input from at least one sensor 18, 28 of the eRESI module 100, such as a P/T signal or inertial measurement signal, to the eRESI controller 20. At 160, the controller 20 applies at least one algorithm to the sensor input, which in a non-limiting example can include selecting a damping control algorithm and a damper position algorithm from memory 22 which corresponds to the passive damper 105, e.g., is associated in a look-up table with the passive damper 105 and/or otherwise selected or configured, for example, during initial installation and/or calibration of the eRESI module 100 to the passive damper 105 of the vehicle 200, for use with the passive damper 105, based on one or more of the model and/or type of the passive damper 105 and/or one or more characteristics of the passive damper 105 such as the rod diameter of the damper rod 110, the stroke length of rod travel of the damper rod 110 over a full stroke of the damper 105, for example, between a fully extended (rebound) position 196E (see FIG. 18A) and a fully compressed position 196C (see FIG. 18B), the volume of hydraulic fluid 114 contained in the damper cylinder 180 and/or displaced from the damper cylinder 180 to the eRESI assembly 10 over a full stroke of the damper 105, the valving configuration of the passive damper 105, etc.

During initial installation and/or calibration of the eRESI module 100 to the passive damper 105, the calibration sequence can include inputting, for example, at least two calibration data sets to the controller 20, which can include a first calibration data set collected with the damper rod 110 of the passive damper 105 in a first known damper position (first calibration position) along the stroke length of the damper 105, and a second calibration data set collected with the damper rod 110 of the passive damper 105 in a second known damper position (second calibration position) along the stroke length of the damper 105. The example is non-limiting, and additional calibration data sets can be collected for input during a calibration sequence calibrating the eRESI module 100 to the damper 105. In an illustrative example, the first calibration data set can be collected with the damper rod 110 extended to a full damper rebound position 196E (see FIG. 18A), where, with the damper rod 110 at damper position 196E (first calibration position), the temperature and pressure of the gas 116 in the reservoir gas chamber 38 is measured via the P/T sensor 18, the volume of the gas 116 in the reservoir gas chamber 38 with the damper rod 110 at the first calibration position is determined, and the first pressure (P1), first temperature (T1) and first volume (V1) of the gas 116 in the reservoir gas chamber 38 with the damper rod 110 at the first calibration position is stored to the controller memory 22 associated with the first damper position 196E, as the first calibration data set (P1, T1, V1, 196E). The second calibration data set can be collected with the damper rod 110 compressed to a second damper position, such as a fully compressed position 196C (see FIG. 18B), where, with the damper rod 110 at damper position 196C (second calibration position), the temperature and pressure of the gas 116 in the reservoir gas chamber 38 is measured via the P/T sensor 18, the volume of the gas 116 in the reservoir gas chamber 38 with the damper rod 110 at the second calibration position is determined, and the pressure (P2), temperature (T2) and volume (V2) of the gas 116 in the reservoir gas chamber 38 with the damper rod 110 at the second calibration position is stored to the controller memory 22 with the second damper position 196C, as the second calibration data set (P2, T2, V2, 196C). During the calibration sequence, the first calibration data set (P1, T1, V1, 196E) and the second calibration data set (P2, T2, V2, 196C) are associated with the selected algorithm(s), which can include a damping control algorithm and a damper position algorithm. The example of collecting the first and second calibration data sets with the damper rod 110 respectively at first and second damper positions 196E, 196C is illustrative and non-limiting. For example, the calibration sequence can include collecting, inputting and storing a first calibration data set (P1, T1, V1, 196$n$1) with the damper rod 110 at a first damper position 196$n$1 where 196E≥196$n$1≥196C, and collecting, inputting and storing a second calibration data set (P2, T2, V2, 196$n$2) with the damper rod 110 at a second damper position 196$n$2 where 196E≥196$n$2≥196C and where 196$n$1≠196$n$2, e.g., the first and second damper positions 196$n$1 and 196$n$2 are different damper rod positions. A third calibration data set (P3, T3, V3, 196$n$3) can be collected with the damper rod 110 at a third damper position 196$n$3 where 196E≥196$n$3≥196C and where 196$n$≠196$n$2≠196$n$3, and so forth, with each calibration data set being stored to the memory 22 and associated with the algorithm(s) selected for the damper 105 to which the eRESI module has been installed.

The damper position algorithm, in a non-limiting example, uses a combined gas law such as P1V1/T1=P2V2/T2, in combination with the P/T signal input received from the P/T sensor 18 in real time, to determine the damper position 196 in real time, e.g., to determine 196($t$) at time t, using the pressure P(t) and temperature T(t) determined at time (t) from the P/T signal input received from the P/T sensor 18 at time t. The damper position algorithm, in a non-limiting example, can be continuously applied to the P/T signal input received from the P/T sensor during operation of the eRESI module, such that damper position algorithm can be applied to the damper position 196($t$1) determined at a first time (t1) and the damper position 196($t$2) determined at a second time (t2) to determine the direction of movement of the damper rod (for example, relative to arrow 185 shown in FIG. 1), the rate of movement of the damper rod (damper rod velocity), etc. The damping control algorithm, in one example, uses one or more of the damper position 196, the direction of movement 185 of the damper rod, and/or the damper rod velocity, to generate an actuator control signal, also referred to herein as an actuator signal, which is outputted to the actuator 30 in real time to dynamically control the damping force output of the damper 105 by actuating the actuator 30 to vary the fluid flow through the base valve assembly 50 of the eRESI assembly 10. In one example, the control loop illustrated by the method shown in FIG. 14 can be executed at a frequency of 1 to 2 milliseconds per loop such that the eRESI controller 20 can output a control signal to the actuator 30 every 1 to 2 milliseconds, to substantially continuously pilot the variable base valve assembly 50 in response to inputs received by the eRESI controller 20 from the P/T sensor 18, and/or inputs received in real time from the P/T sensor 18 in combination with additional inputs received by the eRESI controller 20 from one or more or a combination of the eRESI sensor 28, vehicle sensors 135 and/or vehicle modules 140, which can be used by the damping control algorithm as additional inputs in generating the actuator control signal outputted from the controller 20 to the actuator 30, and to dynamically vary hydraulic fluid flow via the base valve assembly 50 of the eRESI assembly 10, thereby dynamically control the damping force output of the damper 105.

In one example, the damper position algorithm and/or the damping control algorithm uses only the P/T signal input received from the P/T sensor 18, or a combination of the P/T signal from the P/T sensor 18 and data generated by the eRESI sensor 28, which can include, for example, inertial data where the eRESI sensor 28 is configured as an inertial measurement unit (IMU), such that the eRESI module 100 disclosed herein is adaptable to a damper 105 independent of the original equipment configuration of the vehicle 200. Likewise, because the eRESI module 100 is adaptable to, e.g., can be used to control, any standard monotube damper, the eRESI module 100 is advantaged by being highly flexible and universal in design. For example, monotube dampers, patented by Bilstein in 1953, are widely used in vehicles. Because the eRESI module 100 is configured to be operable completely independent of the technology located inside a monotube damper, e.g., a passive damper 105, the eRESI module 100 can be installed universally to any monotube damper installed to any vehicle, such that the eRESI module 100 can be readily and easily installed to any vehicle suspension module 215 (see FIG. 16) including monotube dampers, to add semi-active control to the monotube damper and to the vehicle damping system, and at a substantially reduced cost relative to conventional combination damper/reservoir semi-active systems which must either be installed as OE equipment to the vehicle, or which require significant modification to a vehicle and vehicle suspension originally equipment with passive dampers, to be installed as aftermarket equipment at a substantial expense.

In a non-limiting example, the eRESI 100 can be configured such that the eRESI 10 is connected to the vehicle network 130 and the vehicle module 140 is configured to perform the functions of the controller 20, for example, by installing software including actuator control algorithm(s) and damper position algorithm(s) to the vehicle module 140 and/or such that the software is accessible by the eRESI 100 including the sensors 18, 28 and actuator 30 and/or the vehicle module 140 via the network 130. In one example, the damping control algorithm includes the damper position algorithm.

Figure 23:
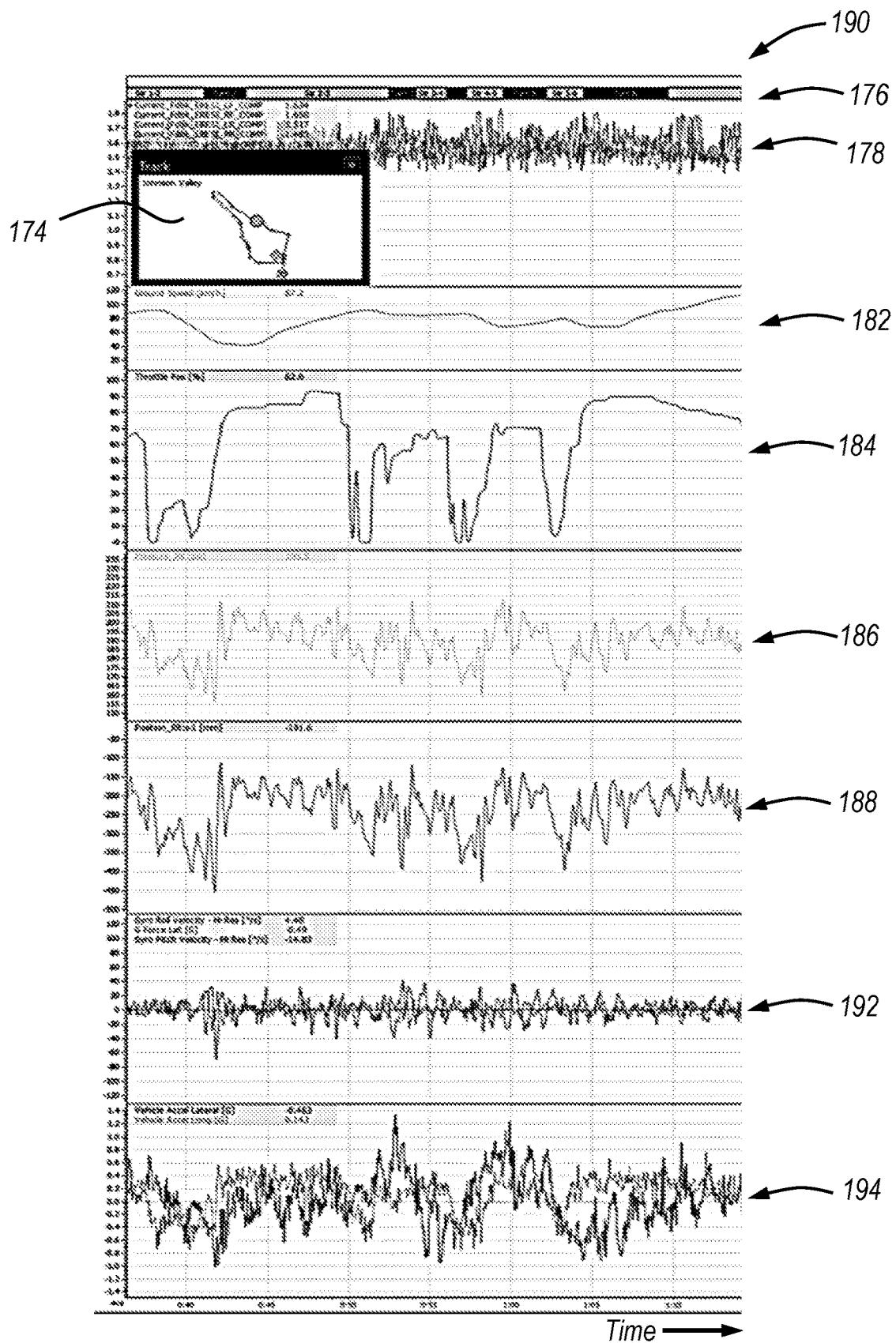
FIG. 23 is an example illustration of signal and/or sensor data used in development of one or more algorithms for determining damper position and/or for control of an eRESI actuator to provide semi-active control of damping force output.

Referring again to FIG. 14, the control loop 150, as described previously, includes at 155 receiving sensor input from the P/T sensor 18, and, in some examples, receiving additional input from one or more of an eRESI sensor 28, which can include inertial data related to the operation of the vehicle in real time. Continuing at 160, during use, e.g., during operation of the vehicle 200, the controller 20 applies damper position algorithm and a damping control algorithm to the sensor input, and at 165, generates an actuator control signal which is outputted to the actuator 30 of the eRESI assembly 10. At 170, the actuator signal is received by the actuator 30 and at 175, the actuator 30 is actuated by the actuator signal to vary the fluid flow through the base valve assembly 50 of the eRESI assembly 10, such that the eRESI assembly 10 provides a semi-active variant to the damping force outputted from the damper 105 in real time. In one example, the control loop illustrated by the method shown in FIG. 14 can be executed at a frequency of 1 to 2 milliseconds per loop such that the eRESI controller 20 can output a control signal to the actuator 30 every 1 to 2 milliseconds, to substantially continuously pilot the variable base valve assembly 50 and generate a semi-active response in the damping force outputted from the damper 105, in response to inputs received by the eRESI controller 20 from the P/T sensor 18. FIG. 23 is example illustration of signal and/or sensor data used in development of one or more algorithms for determining damper position and/or for control of an eRESI actuator to provide semi-active control of damping force output as described herein. In the example chart 190 shown in FIG. 23, data was collected during operation of a vehicle 200 along a predetermined driving route 174 including various route segments 176 such as turns, straightaways, etc, executed over time by the vehicle 200. In the illustrative example, an eRESI module 100 was installed to a passive damper 105 in each of the left front (LF), right front (RF), left rear (LR) and right rear (RR) suspension modules 215 of the vehicle 200. (see FIG. 16). During operation of the vehicle 200 along the known route 174, data was collected from various sensors and modules in the vehicle 200, including, for example, signals and/or current feedback 178 collected from each of the eRESI modules 100, vehicle ground speed 182, engine throttle position 184, pressure 186 of the gas pressure in the gas chamber 38 of the eRESI assembly 10, damper position 188 measured by a vehicle damper position sensor, inertial data 192 such as gyro outputs including roll velocity, G-force, and pitch velocity, and vehicle acceleration 194 including lateral and longitudinal acceleration. As shown by a visual comparison of the eRESI gas pressure 186 measured via the P/T sensor 18, to the damper position 188 measured by conventional vehicle sensors, direct correlation was observed between the pressure 186 of the gas in the eRESI gas chamber 38 and the measured damper position 188, validating the damper position algorithm described herein for generating the damper position 196 in real time using the P/T signal outputted from the P/T sensor 18.

In one example, the actuator 20 is configured as a solenoid valve including an armature 32 which in the example shown is configured as a pintle. The armature 32 can be spring loaded, such that in an actuated condition the armature 32 is one of retracted into or extended from the armature passage 74, and in a non-actuated condition, the armature 32 is spring loaded to the other of the retracted and extended position. In an illustrated example, the armature 32 is retracted in a non-actuated condition, such that, in the non-actuated condition the armature port 70 is in a fully open (unblocked) condition and hydraulic fluid 114 is flowable through flow paths 88, 90, and 92 such that hydraulic fluid 114 can flow through the base valve piston 56 and into the fluid chamber 36 via the chamber port 34, via the actuator port 70, and the cartridge port 80, and such that the variable base valve assembly 50 is in the fully open valve position shown in FIGS. 10 and 11, and such that the compression force exerted by the damper 105, with the armature 32 in the fully retracted position and the variable base valve assembly 50 in the fully open valve position, is substantially the same, e.g., comparable, to the baseline compression force which would be exerted by the damper 105 when connected to a passive reservoir.

When the actuator 30 is actuated such that the armature 32 is extended by the solenoid actuator 30 to a fully extended position and fully blocks the armature port 72, the variable base valve assembly 50 is in a fully closed valve position shown in FIGS. 12 and 13, such that hydraulic fluid 114 flowing into the central bore 63 of the cartridge 52 via fluid paths 84 and 86 is prevented from flowing through the armature port 70, e.g., flow paths 90 and 92 are blocked, and fluid flow is directed to flow through fluid path 88, e.g., via the cartridge port 80 into the annular groove 78 of the cartridge, where the directed fluid flow exerts increased pressure on the restrictor piston 54, causing axial movement of the restrictor piston 54 toward the base valve piston 56, such that the deflection disk disposed between the restrictor piston 54 and base valve piston 56 is deflected to restrict and/or diminish fluid flow via fluid path 84. By restricting the fluid flow through the base valve assembly 50 as described, the restricted hydraulic fluid increases the pressure differential in the damper cylinder 180 such that with the base valve assembly 50 actuated to the fully closed valve position shown in FIGS. 12 and 13, the compression force outputted by the eRESI controlled damper 105 is increased substantially, by an order of magnitude of five to ten times the baseline compression force of the passive damper 105, as shown in the force velocity graph 145 illustrated in FIG. 15, where, in the fully closed valve position shown in FIGS. 12 and 13, the compressive force outputted by the eRESI controlled damper 105 is near the upper limit of the range of compressive damping force shown in the graph. The example valving strategy shown in the figures is non-limiting, such that other different valving strategies, such as the use of poppet valves, spool valves, flow control valves, etc. could be used within the base valve assembly 50 to generate preload on the shim stacks, e.g., to selectively restrict oil flow through the base valve assembly 50.

In operation, a control loop such as the control loop 150 shown in FIG. 14 can be continuously executed by the eRESI controller 20, such that the eRESI controller 20 continuously and dynamically receives and analyzes inputs from the one or more sensors 18, 28, 135 and/or vehicle modules 140 (depending on the installed configuration of the eRESI module 10) and continuously generates an actuator signal to dynamically actuate the actuator 30 to actuate the armature 32 to an infinite number of positions between fully retracted and fully extended, such that the variable based valve assembly 50 is continuously actuated to a valve position between fully open (FIGS. 10 and 11) and fully closed (FIGS. 12 and 13), to provide a control authority to the eRESI controlled damper 105 such that the damper 105 outputs a compression force which corresponds to the actuator signal within the compression force area shown in FIG. 15.

In another example, the actuator 30 can be configured as a voice coil actuator, such that the armature 32 can bidirectionally actuated between a fully retracted position and a fully extended position, where movement in each of the retracted and extended directions is positively controlled by actuation of the voice coil actuator. The example is non-limiting, in that other types of actuators 30, such as linear actuators, stepper motors, and/or pneumatic actuators could be used.

Figure 16:
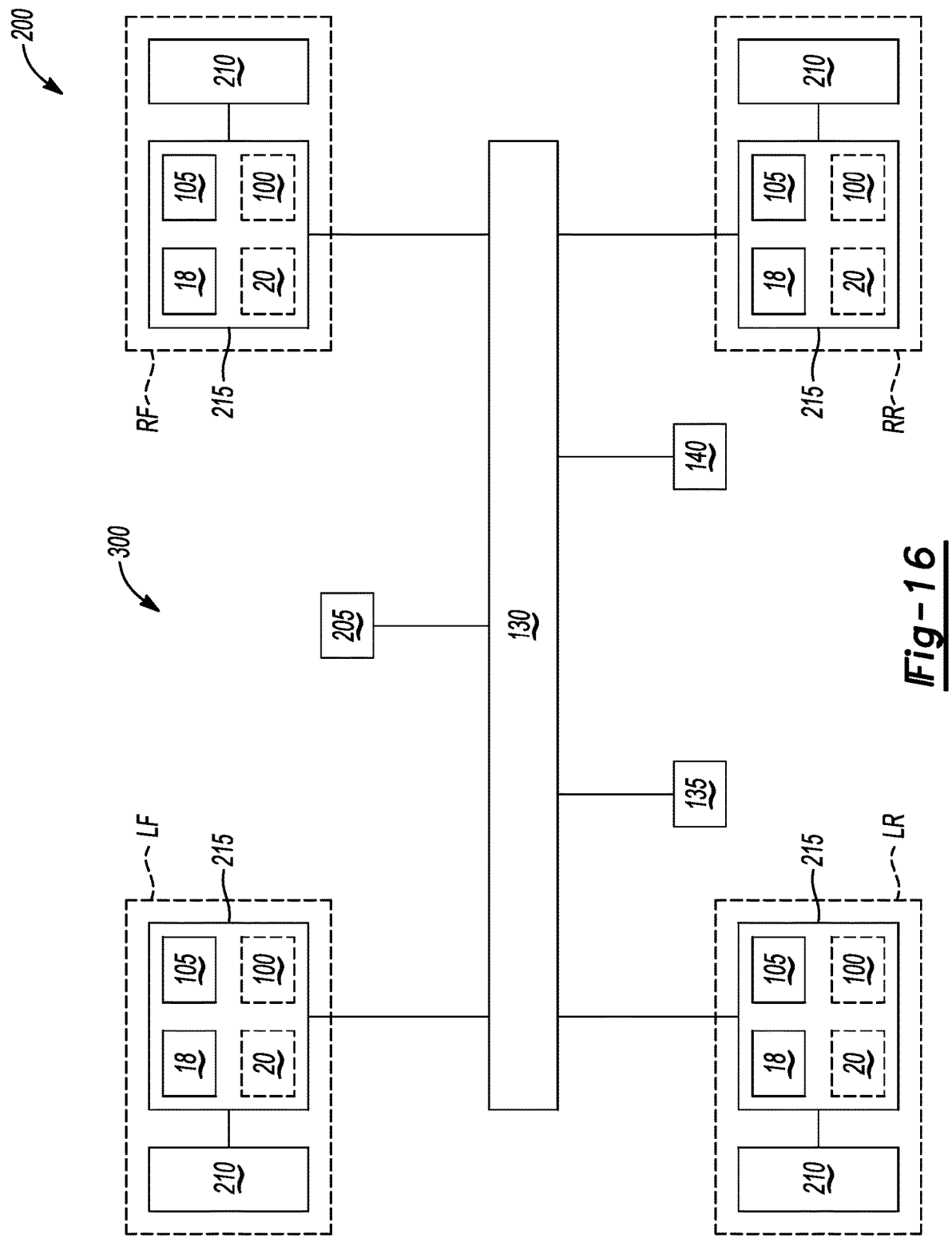
FIG. 16 is a schematic illustration of a system for determining the damper position of one or more dampers installed to a suspension module of a vehicle and in communication with a vehicle network and controlling a vehicle component using the damper position.

Referring now to FIGS. 16-23, in a non-limiting example, FIG. 16 illustrates a system 300 for sensing the damper position of a passive damper 105 included in a suspension module 215 of a vehicle 200. In an illustrative example shown in FIG. 16, the system 300 can be installed to a vehicle 200 which can include a plurality of suspension modules 215. Each of the suspension modules 215 is operably connected to a road wheel 210 of the vehicle, such that road load, vehicle load and/or other suspension load transmitted to and/or through the suspension module 215 to a damper 105 included therein can actuate movement of the damper shaft (piston rod) 110, where the damper rod position 196, in a non-limiting example shown in FIGS. 18A and 18B, changes dynamically in response to the load input, and for example, between a fully extended rebound position 196E and a fully compressed position 196C. In the example shown, the damper position 196 is determined by a stroke length measured from a datum reference 198 defined by a cylinder mount 134 and the rod mount 136. The axial rod displacement 128 between a first damper position and second damper position, e.g., between damper positions 196E and 196C in the present example, is in the same direction and proportional to axial movement 132 of a floating piston 124 disposed in the damper cylinder 180 and separating a hydraulic fluid chamber 118 from a gas chamber 126 of the damper 105. The floating piston 124 moves axially 132 within the cylinder 180 in response to movement 128 of the piston rod 110 and a piston valve 122 attached to the end of the piston rod 110 and disposed within the hydraulic chamber 118 of the damper cylinder 180. When a load exerted on the piston road 110 causes axial displacement of the piston rod and piston valve 122 in the direction of the arrow 185, for example, during compression of the damper 105, piston valve 122 compresses the oil 114 in the hydraulic chamber 118 such that any oil 114 which does not flow through the piston valve 122 exerts a pressure on the floating piston 124, which in response moves axially in the direction 132 to compress gas 116 in the gas chamber 126. A damping force output from the damper 105 is determined by the rate of flow of oil 114 through the piston valve 122 and the pressure exerted by oil 114 and gas 116 (via the floating piston 124) against the piston valve 122 and piston rod 110. The pressurized gas 116 in the gas chamber 126 maintains a load on the floating piston 124 which, in addition to contributing to the damping force outputted by the damper 105, reduces the susceptibility of cavitation of the oil, especially during rapid piston rod movement between jounce and rebound positions.

Figure 22:
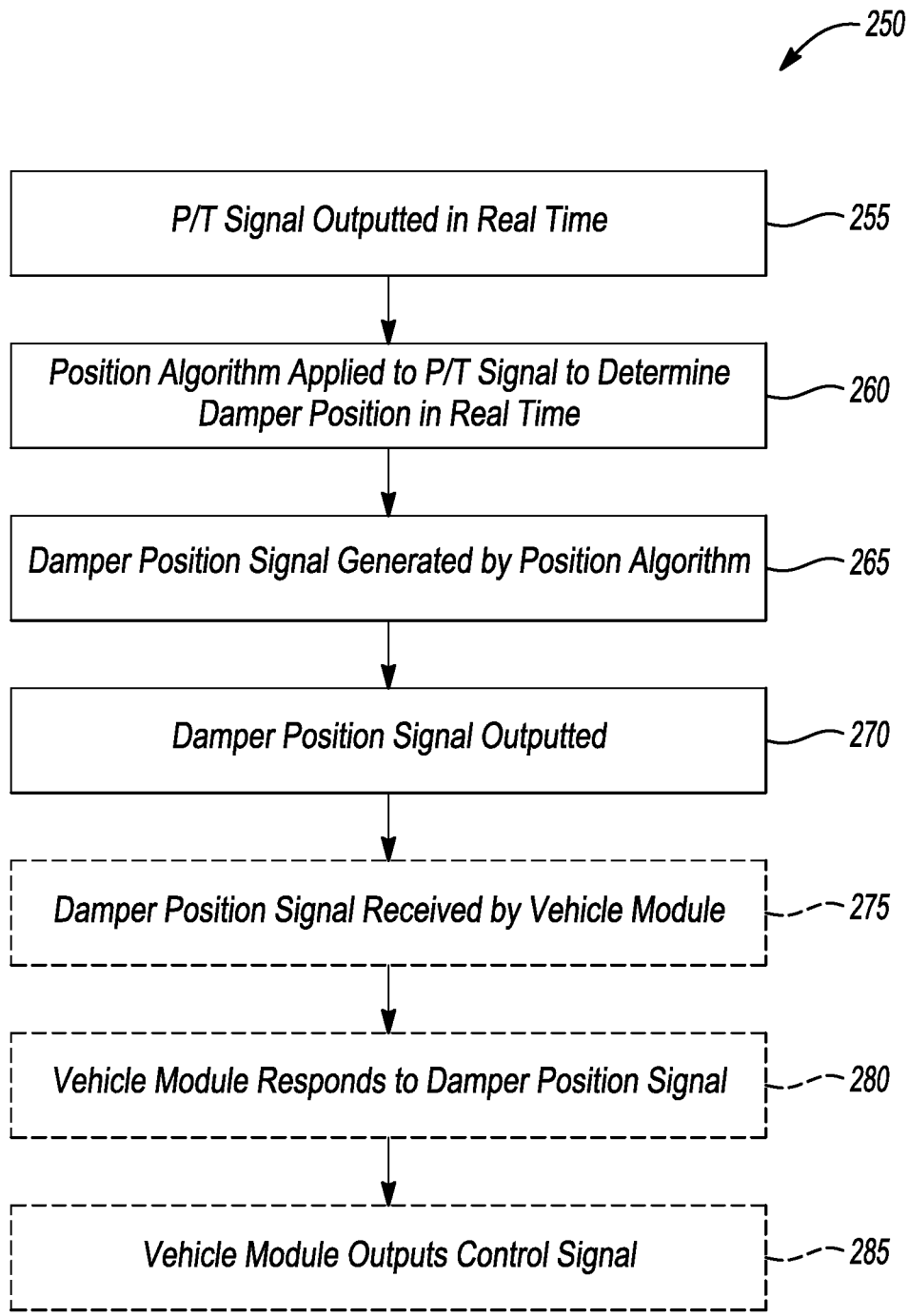
FIG. 22 is a flowchart illustrating an example method for determining the damper position of one or more dampers installed to a suspension module of a vehicle controlling a vehicle component using the damper position.

Referring again to FIG. 16, the damper position system 300 further includes a sensing device 18, also referred to herein as a P/T sensor 18, which is configured, as previously described herein, and as shown in the example illustrated by FIG. 17, for installation to a gas chamber of an eRESI assembly 10 installed to a damper 105 of a suspension module 215, such that the P/T signal can be outputted from the eRESI assembly 10 to an eRESI controller 20, where a damper position algorithm is applied to the P/T data defined by the P/T signal to determine the damper position in real time, and as illustrated by steps 255, 260 and 265 of the damper position method 250 shown in FIG. 22 and previously described as related to the operation of the eRESI module 100.

In another example, the damper position of a damper 105 installed to the vehicle 200 can be determined by installation of the P/T sensor 18 directly to the damper 105 or to a passive reservoir 144 connected to the damper 105, such that the method 250 described herein and shown in FIG. 22 can be used to determine the damper position without installation of an eRESI module 100 to the damper 105 or to the vehicle 200. Examples of direct installation of the P/T sensor 18 to various passive damper configurations are shown in FIGS. 18A and 18B, FIG. 19, FIG. 20, and FIG. 21. Direct installation of the P/T sensor 18 to a passive damper 105 can include performance of a calibration sequence as described for installation of the P/T sensor 18 to the eRESI assembly 10. The calibration sequence can include identifying the P/T sensor 18 to the damper position software and database, which may be included in and/or stored to an eRESI controller 20 installed to the vehicle 200 with the P/T sensor 18, or which may be installed to the vehicle network 130, for example, to a vehicle module 140, where the P/T sensor identification information, calibration data, algorithms, etc, are also stored to the vehicle module 140, or within the vehicle 200 and accessible by the module 140 via the vehicle network 130. The calibration sequence can include, as previously described, collecting a first calibration data set (P1, T1, V1) with the piston rod 110 (of the damper 105 to which the P/T sensor 18 is installed) in a first damper position 196n1, and collecting at least a second calibration data set (P2, T2, V2) with the piston rod 110 in a second damper position 196n2, for calibration of the damper position algorithm to the damper 105 and P/T sensor 18 installed to the damper 105.

In one configuration, as shown in FIG. 16, an eRESI controller 20 can be installed in the suspension module 215 and/or in the vehicle 200, such that P/T signals output from the P/T sensor 18 in real time (see 255 in FIG. 22) can be received by the eRESI controller 20 for application of a damper position algorithm to the P/T signal to determine the damper position 196 of the damper 105 to which the P/T sensor 18 is installed (see 260 in FIG. 22). The method 250 can further include, at 265, the damper position algorithm and/or the eRESI controller 20 generating a damper position signal defining the damper position in real time, and at 270, transmitting (outputting) the damper position signal to one or more of the vehicle network 130, a vehicle module 140, and/or a vehicle component 205. At 275, the damper position signal is received in real time, and may be acted upon by the receiving vehicle module 140 at 280. The vehicle module 140 can be any electronic control module (ECU) in the vehicle 200 configured to receive and measure analog or digital signals, including a body controller, suspension controller, powertrain controller, and/or headlamp controller. In one example, the vehicle module 140, at 285, outputs a vehicle control signal to the vehicle network 130 and/or to a vehicle component 205. The vehicle control signal may be configured as a command, a diagnostic, etc. In an illustrative example, the vehicle module 140 may be a headlamp controller which receives the damper position signal and/or the P/T signal, determines the damper position from the signal, and outputs a control signal to a headlamp (vehicle component) 205, for example, to adjust the position (angle, direction) of the headlamp 205 in response to the damper position, in real time. The example is non-limiting and it would be understood that the damper position signal can be used as input for the control of various vehicle components 205 including vehicle leveling systems, headlamp control, steering and suspension systems, vehicle stability systems, vehicle information systems including driver information and alert displays, etc.

Figures 18A, 18B:
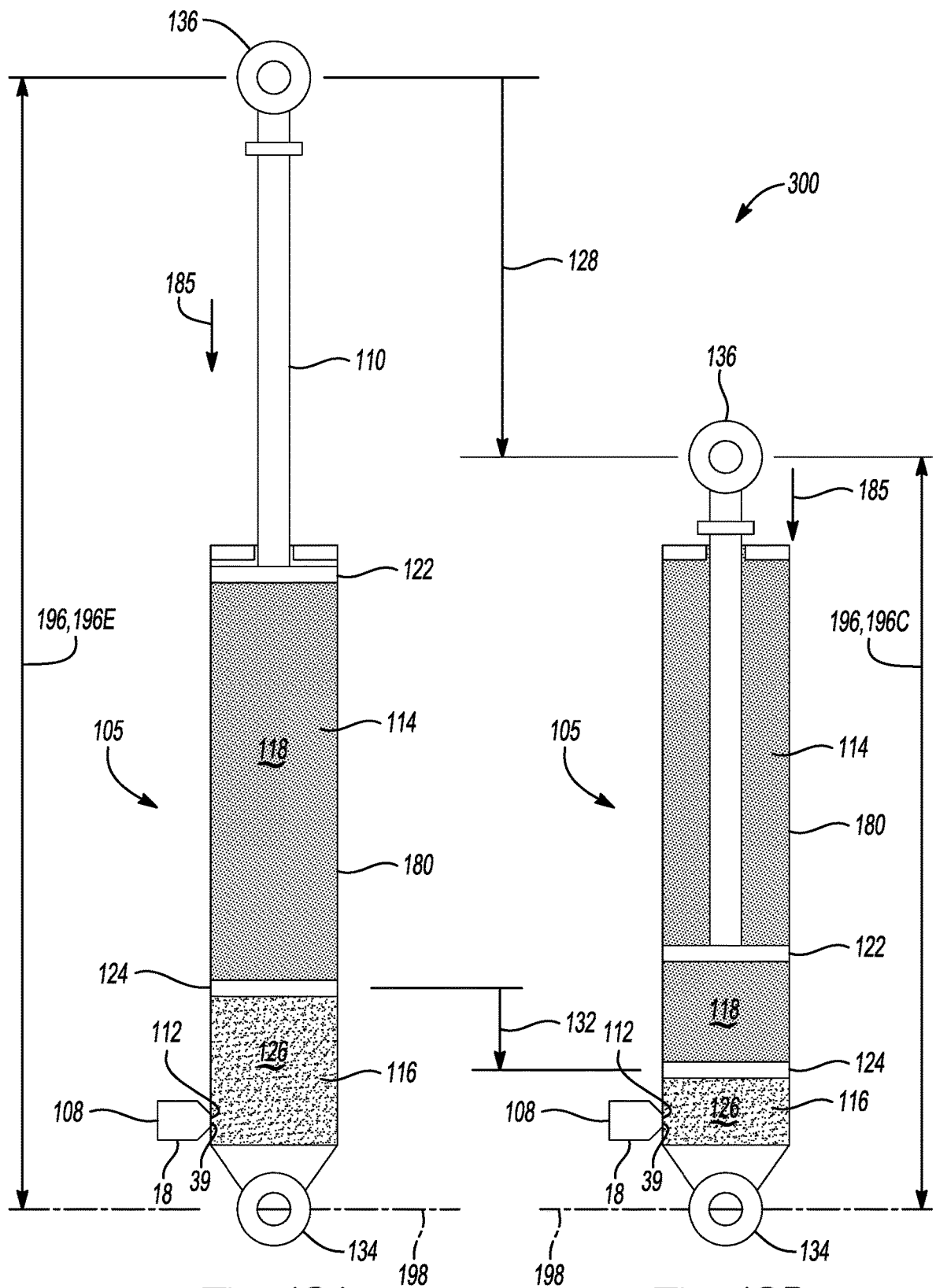
FIG. 18A is a schematic illustration of an example configuration of the damper position system of FIG. 16 including a damper and showing the damper rod in a first position.
FIG. 18B is a schematic illustration of the example configuration of the damper position system of FIG. 18A, showing the damper rod in a second position.

Referring to FIGS. 18A and 18B, shown is an example of a passive monotube damper 105, to which a P/T sensor 18 has been installed such that the sensing interface 112 of the P/T sensor 18 is in fluid communication with the gas 116, for example, nitrogen gas, in the gas chamber 126 of the damper 105. In the example shown, the P/T sensor 18 is installed to a gas port 39 defined by the damper cylinder 108. In one example, the gas port 39 may be configured to receive a Schrader fill valve for injecting gas 116 into the gas chamber 126, and the P/T sensor 18 may be configured such that it be installed to the existing gas port 39, replacing the existing Schrader fill valve. The P/T sensor 18 includes a connector terminal 108, which in one example is configured to receive a connector 40, such as a wiring harness, for connecting the P/T sensor 18 to the vehicle network. In another example, the connector terminal 108 can be configured to wirelessly transmit a P/T signal from the P/T sensor 18 to the vehicle network 130 and/or to one or more vehicle modules 140 and/or one or more vehicle components 205, where these may be configured to measure and/or receive analog or digital signals. The P/T sensor 18 can be networked to the vehicle network 130 via CAN, Ethernet, wireless, optical, smart or any other similar technology.

Figure 19:
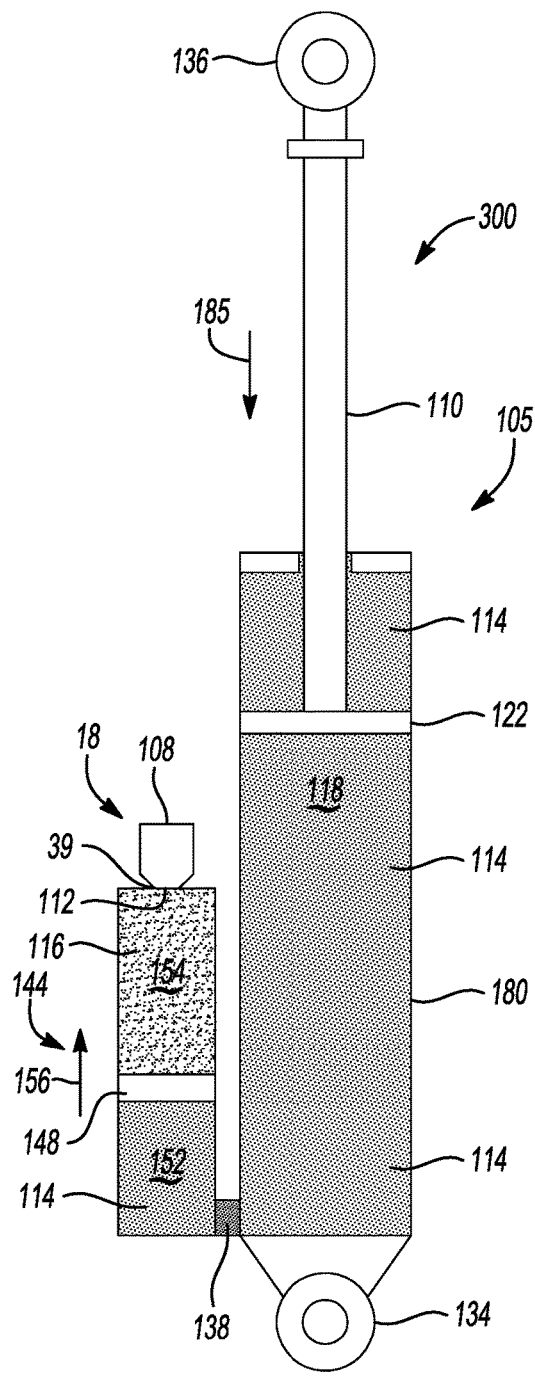
FIG. 19 is a schematic illustration of an example configuration of the damper position system of FIG. 16 including a damper and a passive reservoir integrally connected to the damper.
Figure 20:
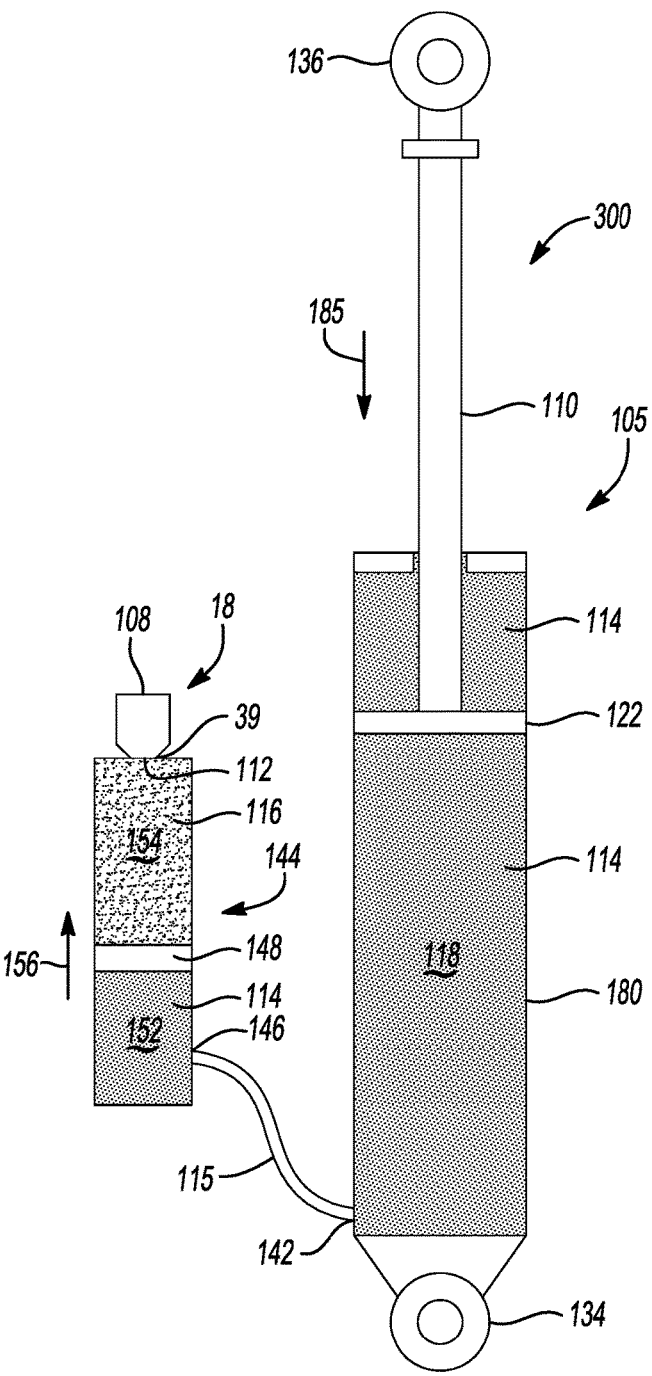
FIG. 20 is a schematic illustration of an example configuration of the damper position system of FIG. 16 including a damper and a passive reservoir remotely connected to the damper via a hose connector.

Referring to FIGS. 19 and 20, shown are an example configuration of the damper position system 300 including a damper 105 and a passive (non-eRESI) reservoir 144 hydraulically connected to the damper 105. In the example shown in FIG. 19, the passive reservoir 144 is integrally connected to the damper 105, via a hydraulic bridge connector 138, also referred to as a bridge block 138 hydraulically connecting the damper oil chamber 118 to a reservoir oil chamber 152, such that the passive reservoir 144 is rigidly connected to the damper 105 in a fixed orientation. In the example shown in FIG. 20, the passive reservoir 144 is flexibly connected to the damper 105, via a hydraulic hose 115 fluidly connected at a first end to the damper oil chamber 118 via a damper oil port 142, and fluidly connected at a second end to a reservoir oil chamber 152 via a reservoir oil port 146, such that the passive reservoir 144 can be flexibly positioned relative to the damper 105, for example, mounted to the damper 105 or to an adjacent vehicle component. The passive reservoir includes a reservoir floating piston 148 separating the reservoir oil chamber 152 from a reservoir gas chamber 154. One of the passive reservoir 144 and the damper 105 can include a passive base valve assembly (not shown) for passively regulating flow of oil 114 between the damper oil chamber 118 and reservoir oil chamber 152, as is known in the art. Axial movement of the damper rod 110 in the direction 185 causes oil which is not flowed through the piston valve 122 to be displaced to reservoir oil chamber 152, causing axial movement of the reservoir floating piston 148 in the direction shown by arrow 156, compressing gas 116 contained in the reservoir gas chamber 154, such that the measured pressure and temperature of the gas 116 in the reservoir gas chamber 154 can be used by the damper position algorithm previously described herein to determine the damper position of the damper rod 110. As described for FIGS. 18A and 18B, in the examples shown in FIGS. 19 and 20, a P/T sensor 18 has been installed to the passive reservoir 144 via a gas port 39, such that the sensing interface 112 of the P/T sensor is in fluid communication with the gas 114 in the reservoir gas chamber 154. As described for FIGS. 18A and 18B, for the examples shown in FIGS. 19 and 20, a calibration sequence must be performed, including identifying the P/T sensor 18 to the damper position software and database, which may be included in and/or stored to an eRESI controller 20 installed to the vehicle 200 with the P/T sensor 18, or which may be installed to the vehicle network 130, for example, to a vehicle module 140, where the P/T sensor identification information, calibration data, algorithms, etc, are also stored to the vehicle module 140, or within the vehicle 200 and accessible by the module 140 via the vehicle network 130. The calibration sequence can include, as previously described, collecting a first calibration data set (P1, T1, V1) with the piston rod 110 (of the damper 105 to which the P/T sensor 18 is installed) in a first damper position 196n1, and collecting at least a second calibration data set (P2, T2, V2) with the piston rod 110 in a second damper position 196n2, for calibration of the damper position algorithm to the damper 105 and P/T sensor 18 installed to the passive reservoir 144 connected to the damper 105.

Figure 21:
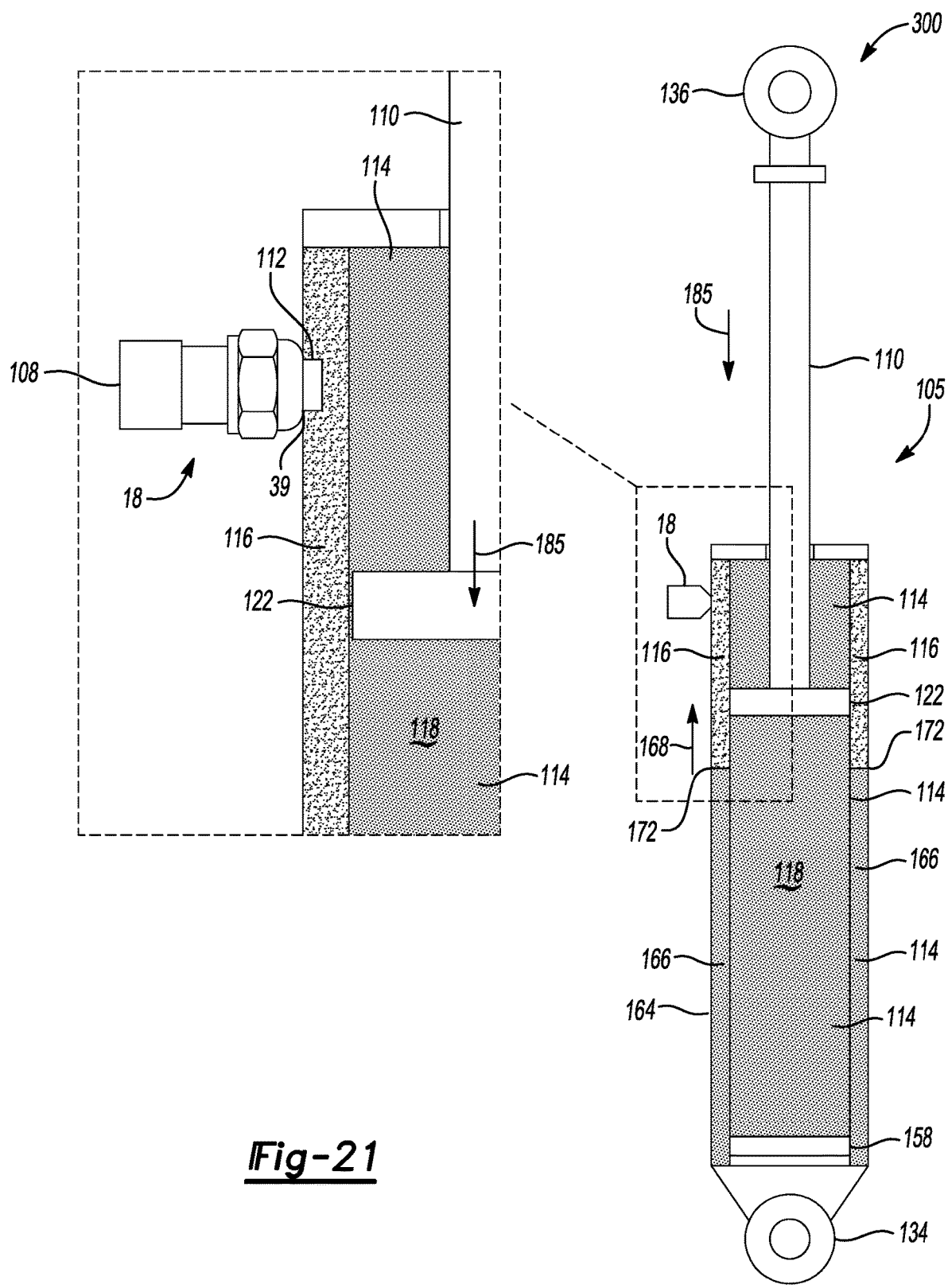
FIG. 21 is a schematic illustration of an example configuration of the damper position system of FIG. 16 including a twin tube damper.

Referring to FIG. 21, shown is an example configuration of the damper position system 300 of FIG. 16 including a twin tube damper 105. In the example shown in FIG. 21, the damper cylinder includes an inner tube 162 and an annular outer tube 164 separated from the inner tube 162 by a passive base valve assembly 158. Oil 114 contained in the oil chamber 118 defined by the inner tube 162 flows, in response to axial move of the damper rod 110, via the base valve assembly 158 between the inner oil chamber 118 and a reserve cavity 166 defined by the outer tube 164. The outer tube 164 includes gas 116 which separates from the oil 114 at an oil/gas interface 172 to form a gas pocket at one end of the annular reserve cavity 166. Axial movement of the damper rod 110 in the direction 185 causes oil which is not flowed through the piston valve 122 to be displaced to reserve cavity 166, causing axial movement of the oil 116 in the reserve cavity 166 in the direction shown by arrow 168, compressing gas 116 contained in the gas pocket, such that the measured pressure and temperature of the gas 116 in the reserve cavity 166 can be used by the damper position algorithm previously described herein to determine the damper position of the damper rod 110. As described for FIGS. 18A and 18B, in the example shown in FIG. 21 (see magnified section), a P/T sensor 18 has been installed to the reserve cavity 166 via a gas port 39, such that the sensing interface 112 of the P/T sensor is in fluid communication with the gas 116 in the gas pocket formed in the reserve cavity 166. As described for FIGS. 18A and 18B, for the example shown in FIG. 21, a calibration sequence must be performed, including identifying the P/T sensor 18 to the damper position software and database, which may be included in and/or stored to an eRESI controller 20 installed to the vehicle 200 with the P/T sensor 18, or which may be installed to the vehicle network 130, for example, to a vehicle module 140, where the P/T sensor identification information, calibration data, algorithms, etc., are also stored to the vehicle module 140, or within the vehicle 200 and accessible by the module 140 via the vehicle network 130. The calibration sequence can include, as previously described, collecting a first calibration data set (P1, T1, V1) with the piston rod 110 (of the damper 105 to which the P/T sensor 18 is installed) in a first damper position 196n1, and collecting at least a second calibration data set (P2, T2, V2) with the piston rod 110 in a second damper position 196n2, for calibration of the damper position algorithm to the damper 105 and P/T sensor 18 installed to the reserve cavity 166 of the damper 105 shown in FIG. 21.

The examples shown in FIGS. 18A, 18B, 20, 21 and 22 are illustrative and non-limiting, and it would be understood that other configurations for installation of a P/T sensor 18 directly to a damping system, to measure gas pressure and temperature and to apply a damper position algorithm to a P/T signal generated by the installed P/T sensor, would be anticipated within the scope of the present disclosure.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of 'comprising' and "including" to provide more specific embodiments and are also disclosed. As used in this disclosure and in the appended claims, the singular forms "a", "an", "the", include plural referents unless the context clearly dictates otherwise.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A system for converting a damping system including a passive damper to a semi-active damping system, the system comprising:
   an electronically controlled external damper reservoir (eRESI) assembly including:
      a reservoir port configured to hydraulically connect the eRESI assembly to a passive damper and to receive hydraulic fluid from the passive damper via the reservoir port;
      a variable base valve assembly including an actuator, wherein the actuator is configured to selectively change a flow rate of hydraulic fluid through the variable base valve assembly in response to a damping control signal received by the actuator;
      a hydraulic chamber in fluid communication with a reservoir port via the variable base valve assembly;
      a gas chamber containing a gas;
   the system further comprising:
      an input sensor configured to generate an input signal indicative of a vehicle movement and/or a condition related to the vehicle movement;
      a controller in electronic communication with the input sensor and the actuator, the controller programmed to receive the input signal from the input sensor, to generate the damping control signal based on the input signal, and to output the damping control signal to the actuator: and
      a calibration data set inputted to the controller;
      wherein the calibration data set includes a pressure, a temperature, and a volume of the gas contained in the gas chamber while the passive damper is in a known damper position.

2. The system of claim 1, wherein the input sensor is configured as a pressure and temperature (P/T) sensor in direct fluid communication with the gas contained in the gas chamber;
   wherein the P/T sensor is configured to measure a pressure and a temperature of the gas and to generate a P/T signal indicative of the pressure and the temperature of the gas.

3. The system of claim 2, wherein:
the P/T sensor is configured to transmit the P/T signal to the controller;
the passive damper includes a damper rod and a damper cylinder;
the damper position is defined by the position of the damper rod relative to the damper cylinder; and
the controller is programmed to determine a damper position of a passive damper hydraulically connected to the eRESI assembly, based on the P/T signal transmitted from the P/T sensor.

4. The system of claim 3, wherein:
the controller is programmed to determine, based on the P/T signal received from the P/T sensor, a direction of travel of the damper rod relative to the damper cylinder and a velocity of the damper rod.

5. The system of claim 4, wherein the controller is programmed to generate the damping control signal based on a combination of the position, the direction of travel, and the velocity of the damper rod as determined in real time by the controller based on the P/T signal.

6. The system of claim 3, wherein the input sensor includes an inertial measurement unit (IMU) configured to sense inertia of a vehicle including the passive damper and to transmit the input signal based on the inertia of the vehicle to the controller;
wherein the controller is programmed to generate the damping control signal based on a combination of the P/T signal and the input signal based on the inertia of the vehicle.

7. The system of claim 3, wherein:
the input sensor is configured as at least one of a vehicle module or a vehicle sensor;
the input signal is generated by the at least one of the vehicle module or vehicle sensor; and
the controller is programmed to generate the damping control signal based on a combination of the P/T signal and the input signal generated by the at least one of the vehicle module or vehicle sensor.

8. The system of claim 2, wherein the gas chamber includes an end cap configured to seal the gas chamber; and
wherein the P/T sensor is integral to the end cap.

9. The system of claim 1, wherein the actuator is configured to selectively actuate the variable base valve assembly between a first valve position and a second valve position; and
wherein the variable base valve assembly is configured such that, with the variable base valve assembly actuated to the first valve position, a compression force outputted by a passive damper hydraulically connected to the eRESI assembly is substantially the same as a baseline compression force outputted by the passive damper when connected to the passive reservoir.

10. The system of claim 9, wherein the variable base valve assembly is configured such that, with the variable base valve assembly actuated to the second valve position, the compression force outputted by the passive damper hydraulically connected to the eRESI assembly is increased to a range which is 1.5 to 10 times the baseline compression force.

11. The system of claim 1, wherein the input signal includes at least one input signal indicative of a vehicle movement or a condition related to the vehicle movement selected from a group consisting of: damper position of a passive damper hydraulically connected to the eRESI assembly, movement of a damper rod of the passive damper, damper rod velocity, damper rod acceleration, vehicle body motion, vehicle body roll, vehicle body pitch, vehicle body yaw, roll velocity, G-force, pitch velocity, vehicle speed, vehicle acceleration, vehicle inertial data, wheel motion, wheel speed, wheel position, suspension motion, brake torque, throttle position, steering wheel angle, steering wheel angle rate, vehicle acceleration along Ax, Ay, and/or Az vehicle axes, suspension position, temperature, engine torque, tire pressure, vision sensor data, forward looking terrain mapping, global positioning data, Lidar data, and combinations thereof.

12. The system of claim 1, wherein the controller is a vehicle control module; and
wherein the controller is in electronic communication with the actuator via a vehicle network.

13. The system of claim 1, wherein the controller is in wireless communication with the actuator.

14. The system of claim 1, wherein the variable base valve assembly is configured such that the variable base valve assembly is in series with a main piston valve of a passive damper hydraulically connected to the eRESI assembly.

15. A method for converting a damping system including a passive damper to a semi-active damping system, the method comprising:
hydraulically connecting an electronically controlled external damper reservoir (eRESI) assembly to a passive damper via a reservoir port, the eRESI assembly including:
the reservoir port configured to hydraulically connect the eRESI assembly to a passive damper and to receive hydraulic fluid from the passive damper via the reservoir port;
a variable base valve assembly including an actuator, wherein the actuator is configured to selectively change a flow rate of hydraulic fluid through the variable base valve assembly in response to a damping control signal received by the actuator;
a hydraulic chamber in fluid communication with a reservoir port via the variable base valve assembly;
a gas chamber containing a gas;
the method further comprising:
sensing a vehicle movement or a condition related to the vehicle movement, via an input sensor configured to generate an input signal indicative of at least one of the vehicle movement or the condition related to the vehicle movement;
providing a controller in electronic communication with the input sensor and the actuator, wherein the controller includes a processor and tangible, non-transitory memory on which is recorded instructions, such that the controller is programmed to receive the input signal from the input sensor, to generate the damping control signal based on the input signal, and to output the damping control signal to the actuator;
receiving, via the hydraulic port, hydraulic fluid from the passive damper;
sensing, via the input sensor, the vehicle movement and/or the condition related to the vehicle movement;
generating, via the input sensor, the input signal;
receiving the input signal to the controller;
generating, via the controller, the damping control signal based on the input signal; and outputting the damping control signal to the actuator;
the method further comprising:
　calibrating the eRESI assembly to the passive damper by:
　　inputting a calibration data set to the controller;
　wherein the calibration data set includes a pressure, a temperature, and a volume of the gas contained in the gas chamber while the passive damper is in a known damper position.

16. The method of claim 15, wherein the input sensor is configured as a pressure and temperature (P/T) sensor in direct fluid communication with the gas contained in the gas chamber;
the method further comprising:
　measuring, via the P/T sensor, a pressure and a temperature of the gas;
　generating, via the P/T sensor, the input signal configured as a P/T signal indicative of the pressure and the temperature of the gas;
　receiving, via the controller, the P/T signal; and
　determining, via the controller, a damper position of the passive damper, based on the P/T signal received from the P/T sensor.

17. The method of claim 16, further comprising:
determining, via the controller, a damper position of the vehicle damper, based on the P/T signal received from the P/T sensor.

18. The method of claim 16, wherein:
the passive damper includes a damper rod and a damper cylinder;
the damper position is defined by the position of the damper rod relative to the damper cylinder;
the controller is programmed to determine, based on the P/T signal received from the P/T sensor, a direction of travel of the damper rod relative to the damper cylinder and a velocity of the damper rod;
the method further comprising:
　determining, via the controller and based on the P/T signal, the damper position, the direction of travel, and the velocity of the damper rod;
　generating, via the controller, the damping control signal based on a combination of the position, the direction of travel, and the velocity of the damper rod as determined in real time by the controller based on the P/T signal.

19. The method of claim 16, further comprising:
receiving, via the controller, inertia data from an inertial measurement unit (IMU) in electronic communication with the controller;
generating, via the controller, the damping control signal based on a combination of the inertia data and the P/T signal.

20. The method of claim 15, further comprising:
receiving, via the actuator, the damping control signal from the controller; and
actuating the variable base valve assembly, via the actuator, to selectively change a flow rate of hydraulic fluid through the variable base valve assembly based on the damping control signal received by the actuator.

21. The method of claim 15, wherein the known position is a full rebound position.

22. A system for converting a damping system including a passive damper to a semi-active damping system, the system comprising:
　an electronically controlled external damper reservoir (eRESI) assembly including:
　　a reservoir port configured to hydraulically connect the eRESI assembly to a passive damper and to receive hydraulic fluid from the passive damper via the reservoir port;
　　a variable base valve assembly including an actuator, wherein the actuator is configured to selectively change a flow rate of hydraulic fluid through the variable base valve assembly in response to a damping control signal received by the actuator;
　　a hydraulic chamber in fluid communication with a reservoir port via the variable base valve assembly;
　　a gas chamber containing a gas;
the system further comprising:
　an input sensor configured to generate an input signal indicative of a vehicle movement and/or a condition related to the vehicle movement;
　wherein the input sensor is configured as a pressure and temperature (P/T) sensor in direct fluid communication with the gas contained in the gas chamber;
　wherein the P/T sensor is configured to measure a pressure and a temperature of the gas and to generate a P/T signal indicative of the pressure and the temperature of the gas; and
　a controller in electronic communication with the input sensor and the actuator, the controller programmed to receive the input signal from the input sensor, to generate the damping control signal based on the input signal, and to output the damping control signal to the actuator.

23. A method for converting a damping system including a passive damper to a semi-active damping system, the method comprising:
　hydraulically connecting an electronically controlled external damper reservoir (eRESI) assembly to a passive damper via a reservoir port, the eRESI assembly including:
　　the reservoir port configured to hydraulically connect the eRESI assembly to a passive damper and to receive hydraulic fluid from the passive damper via the reservoir port;
　　a variable base valve assembly including an actuator, wherein the actuator is configured to selectively change a flow rate of hydraulic fluid through the variable base valve assembly in response to a damping control signal received by the actuator;
　　a hydraulic chamber in fluid communication with a reservoir port via the variable base valve assembly;
　　a gas chamber containing a gas;
the method further comprising:
　sensing a vehicle movement or a condition related to the vehicle movement, via an input sensor configured to generate an input signal indicative of at least one of the vehicle movement or the condition related to the vehicle movement;
　providing a controller in electronic communication with the input sensor and the actuator, wherein the controller includes a processor and tangible, non-transitor memory on which is recorded instructions, such that the controller is programmed to receive the input signal from the input sensor, to generate the damping control signal based on the input signal, and to output the damping control signal to the actuator;
receiving, via the hydraulic port, hydraulic fluid from the passive damper;

sensing, via the input sensor, the vehicle movement and/or the condition related to the vehicle movement;
generating, via the input sensor, the input signal;
receiving the input signal to the controller;
generating, via the controller, the damping control signal based on the input signal; and
outputting the damping control signal to the actuator;
wherein the input sensor is configured as a pressure and temperature (P/T) sensor in direct fluid communication with the gas contained in the gas chamber;
the method further comprising:
   measuring, via the P/T sensor, a pressure and a temperature of the gas;
   generating, via the P/T sensor, the input signal configured as a P/T signal indicative of the pressure and the temperature of the gas.

* * * * *